(12) United States Patent
Semler et al.

(10) Patent No.: US 12,305,816 B2
(45) Date of Patent: *May 20, 2025

(54) PIPELINE ENERGY RECOVERY SYSTEM

(71) Applicant: InPipe Energy, Inc., Portland, OR (US)

(72) Inventors: Gregory T. Semler, Portland, OR (US);
Caitlin Forinash, Portland, OR (US);
Todd E. Stevens, Portland, OR (US)

(73) Assignee: INPIPE ENERGY, INC., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/408,465

(22) Filed: Jan. 9, 2024

(65) Prior Publication Data

US 2024/0142064 A1 May 2, 2024

Related U.S. Application Data

(63) Continuation of application No. 17/080,620, filed on Oct. 26, 2020, now Pat. No. 11,946,604.

(51) Int. Cl.
| | |
|---|---|
| *F17D 5/00* | (2006.01) |
| *F03B 13/00* | (2006.01) |
| *F03B 13/08* | (2006.01) |
| *F16K 31/126* | (2006.01) |

(52) U.S. Cl.
CPC .............. *F17D 5/00* (2013.01); *F03B 13/00* (2013.01); *F03B 13/08* (2013.01); *F16K 31/1268* (2013.01)

(58) Field of Classification Search
CPC ................................. F03B 13/00; F03B 13/08
See application file for complete search history.

(56) References Cited

U.S. PATENT DOCUMENTS

| | | | |
|---|---|---|---|
| 5,348,036 A | * | 9/1994 | Oksanen ................ G05D 7/03 137/489.5 |
| 7,504,738 B2 | | 3/2009 | Barton et al. |
| 2006/0289816 A1 | | 12/2006 | Weingarten |
| 2011/0006530 A1 | | 1/2011 | Van Blerk |
| 2011/0024132 A1 | * | 2/2011 | Pettit ...................... E21B 34/00 166/373 |

(Continued)

FOREIGN PATENT DOCUMENTS

| | | |
|---|---|---|
| KR | 101555433 B1 | 10/2015 |
| WO | 2018152650 A1 | 8/2018 |

OTHER PUBLICATIONS

Ye, G. et al., "Energy Harvesting from Water Distribution Systems," Journal of Energy Engineering, vol. 138, No. 1, Mar. 2012, 12 pages.

(Continued)

*Primary Examiner* — Sean Gugger
(74) *Attorney, Agent, or Firm* — McCoy Russell LLP

(57) ABSTRACT

Methods and systems are provided for a power-generating fluid flow arrangement. In one example, the fluid flow arrangement may include a primary conduit flowing a pressurized fluid and a bypass conduit coupled to the primary conduit. The bypass conduit may divert a portion of the pressurized fluid flow from the primary conduit to drive rotation of a turbine. A dual solenoid operated control valve may be arranged in the bypass conduit to control both flow and pressure in the fluid flow arrangement.

20 Claims, 14 Drawing Sheets

(56) References Cited

U.S. PATENT DOCUMENTS

| | | |
|---|---|---|
| 2013/0038072 A1 | 2/2013 | Miller et al. |
| 2014/0052308 A1 | 2/2014 | Hanafusa |
| 2014/0265328 A1 | 9/2014 | Van Blerk |
| 2015/0260151 A1* | 9/2015 | Kang ................. F03B 15/16 700/282 |

OTHER PUBLICATIONS

Fontana, N. et al., "Losses Reduction and Energy Production in Water Distribution Networks," Journal of Water Resources Planning and Management, vol. 138, No. 3, May 2012, 10 pages.
"Sustainable Energy and Monitoring Systems (SEMS)," Rentricity Schematic Website, Available Online at https://rentricity.com/offerings/equipment/, Available Online as Early as May 7, 2012, 1 page.
Carravetta, A. et al., "Energy Production in Water Distribution Networks: A PAT Design Strategy," Water Resource Manage, vol. 26, No. 13, Oct. 2012, Available Online Aug. 8, 2012, 14 pages.
Shafer, L. et al., "Centrifugal pumps as hydraulic turbines—Pumps as turbines: Systems and applications," Power Fluids, vol. 7, No. 3, Available as Early as Jan. 2013, 5 pages.
Carravetta, A. et al., "PAT Design Strategy for Energy Recovery in Water Distribution Networks by Electrical Regulation," Energies, vol. 6, No. 1, Jan. 17, 2013, 14 pages.
Allen, G. et al., "In-Conduit Hydropower Project—Phase I Report," Executive Office of Energy & Environmental Affairs Department of Environmental Protection, CDN Assets Website, Available Online at http://cdnassets.hw.net/2e/fd/58ca4ccf465ab32ebb17ebc4c588/hydrop1.pdf, Aug. 2013, 31 pages.
Coughlan, P. et al., "Energy recovery in the water industry using micro-hydropower: An opportunity to improve sustainability," Water Policy, vol. 16, No. 1, Feb. 2014, 17 pages.
Su, P. et al., "Micro hydroelectric energy recovery in municipal water systems: A case study for Vancouver," Urban Water Journal, vol. 12, No. 8, Jul. 23, 2014, 15 pages.
Sale, M. et al., "Opportunities for Energy Development in Water Conduits," Oak Ridge National Laboratory Website, Available Online at https://info.ornl.gov/sites/publications/files/Pub50715.pdf, Sep. 2014, 80 pages.
Roberts, P. et al., "Venturi-Enhanced Turbine Technology," Proceedings of the 2014 International Conference on Ocean Energy, Nov. 4, 2014, Halifax, Nova Scotia Canada, 10 pages.
"Pumped Storage and Potential Hydropower from Conduits," U.S. Department of Energy Website, Available Online at https://www.energy.gov/sites/prod/files/2015/06/f22/pumped-storage-potential-hydropower-from-conduits-final.pdf, Feb. 2015, 24 pages.
"In-pipe Turbine: Power From Pressure," Leviathan Energy Website, Available Online at http://leviathanenergy.com/technology/in-pipe-hydroelectric/, Available Online as Early as Feb. 26, 2015, 2 pages.
Samora, I., "Optimization of low-head hydropower recovery in water supply networks," Laboratory of Hydraulic Constructions, Comm. 65, Available as Early as Jan. 2016, 203 pages.
"Nline Energy," Proceedings of the California Municipal Utilities Association Annual Conference, Apr. 12, 2016, San Francisco, California, 13 pages.
"Colorado PRV-Hydropower Assessment," Colorado Government Website, Available Online at https://www.colorado.gov/pacific/sites/default/files/atoms/files/PRV%20Hydro%20Assessment%20Report.pdf, Jun. 2016, 36 pages.
"In-conduit Hydropower Opportunities in SMUD's Service Territory," RFTP No. 6, Rev. 1, GEI Consultants, Jul. 2016, 74 pages.
"Energy Recovery from PRV Stations Using Hydrokinetic Turbines," Water Research Foundation Webcast, Youtube Website, Available Online at https://www.youtube.com/watch?v=CwJr6WTrX-o, Jul. 12, 2016, 40 pages.
De Marchis, M. et al., "Energy Saving in Water Distribution Network through Pump as Turbine Generators: Economic and Environmental Analysis," Energies, vol. 9, No. 12, Oct. 26, 2016, 16 pages.
"Pressure Reducing Valve With Integral Back-Up-Engineered to be Used Anywhere Pressure Reducing Valve Failure Is Unacceptable," CDN2 Hubspot Website, Available Online at https://cdn2.hubspot.net/hubfs/230272/Product_Manuals/Pressure_Reducing_Product_Guides/PRSM-Brochure-2017-web.pdf, Available as Early as Jan. 2017, 8 pages.
United States Patent and Trademark Office, Office Action Issued in U.S. Appl. No. 15/471,257, filed May 1, 2018, 18 pages.
Simão, M et al., "Flow Conditions for PATs Operating in Parallel: Experimental and Numerical Analyses," Energies, vol. 12, No. 901, Mar. 8, 2019, 19 pages.
Semler, G. et al., "Modularization of an Electric Power Generating Fluid Flow Arrangement," U.S. Appl. No. 16/663,145, filed Oct. 24, 2019, 41 pages.
"Free, clean and predictable—Renewable power generation from fluid pressures," California Public Utilities Commission Website, Available Online at https://www.cpuc.ca.gov/WorkArea/DownloadAsset.aspx%3Fid%3D7316+&cd=1&hl=en&ct=clnk&gl=us, Available as Early as Jan. 2020, 17 pages.
United States Patent and Trademark Office, Office Action Issued in U.S. Appl. No. 16/663,145, Sep. 4, 2020, 18 pages.
ISA Korean Intellectual Property Office, International Search Report and Written Opinion Issued in Application No. PCT/US2021/054624, Jan. 26, 2022, WIPO, 12 pages.

\* cited by examiner

PIPELINE ENERGY RECOVERY SYSTEM

CROSS REFERENCE TO RELATED APPLICATIONS

The Present application is a continuation of U.S. Non-Provisional patent application Ser. No. 17/080,620, entitled "PIPELINE ENERGY RECOVERY SYSTEM", and filed on Oct. 26, 2020. The entire contents of the above-listed application are hereby incorporated by reference for all purposes.

FIELD

The present description relates generally to methods and systems for generating electric power by flowing a fluid through a hydro turbine coupled to a generator.

BACKGROUND/SUMMARY

Energy may be harvested from fluid flowing under the influence of gravity. For example, pressurized fluids flowing in gravity-fed pipelines may enable at least a portion of a potential energy of the system to be extracted and converted to another usable form. Fluid-based energy extraction may be applied to systems such as municipal water transmission and distribution pipelines, agricultural water transmission and distribution pipelines, as well as wastewater effluent pipes/pipelines from wastewater treatment plants, industrial effluent, desalination plants, and electrical power plants. In some examples, without implementing mechanisms to extract energy from such systems, the harvestable energy may be squandered.

Efforts to extract energy from moving fluids include installing hydroturbines in new and existing pipelines. The fluid flowing within the pipeline spins a turbine and a connected generator to produce electricity. In some pipelines, particularly water pipelines, pressure reducing valves are used to deliver water to customers at a specified pressure. In this instance, a turbine and generator can harvest hydraulic energy to produce useful electricity, which would otherwise have been dissipated by the pressure reducing valve.

In other examples, a modified version of the in-pipe turbine described above may be implemented. For example, a fluid may be diverted from an existing pipeline through a parallel pipe loop, or bypass loop, in which a turbine and coupled generator are installed. This isolates the bypass loop from the existing pipeline such that the bypass hydraulic system can be engaged or disengaged at will, without affecting the operation of the existing pipeline. These systems mimic the functionality of a pressure reducing valve using a hydro-turbine with a control valve so that a pipeline owner can both control pressure and produce renewable energy.

Regardless of a specific configuration of the mechanism for extracting energy from a flowing fluid, adaptation of the mechanism to a hydraulic system may demand detailed knowledge of the hydraulics of a specific site, which may be variable over the course of a day, week, month, and/or year. Customization of the mechanism to a specific site may be required, a process which may be prohibitively costly.

In one example, the issues described above may be at least partially addressed by a fluid flow arrangement, comprising a primary conduit flowing a pressurized fluid, a bypass conduit coupled to the primary conduit to divert at least a portion of the pressurized fluid flow from the primary conduit through the bypass conduit, and a dual valve arranged in the bypass conduit, the dual valve configured to control flow and pressure in the bypass conduit. In this way, hydroelectric power-generating equipment configured to be implemented both efficiently and at low cost at a site of a new or existing pipeline may be provided.

As one example, the dual valve precludes a demand for more than one control valve in the bypass conduit. The dual valve may control a flow of fluid exiting the bypass conduit to merge with fluid in the primary conduit such that fluctuations in pressure in the primary conduit are minimized. Use of the dual valve reduces an overall footprint of the bypass conduit, and allows the fluid flow arrangement to be adapted with multiple turbines to maximize energy extraction from the pressurized fluid flow.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
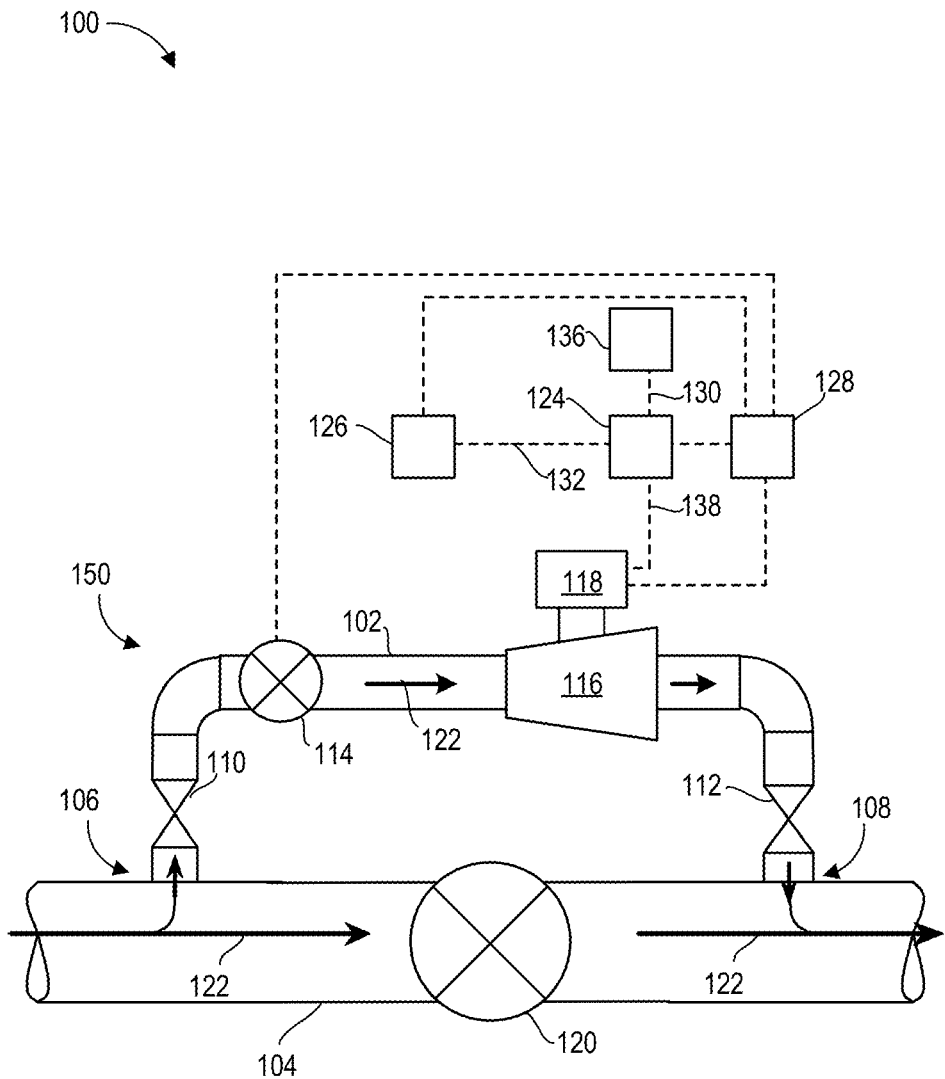
FIG. 1 schematically illustrates an example of a power-generating fluid flow arrangement.
Figure 2:
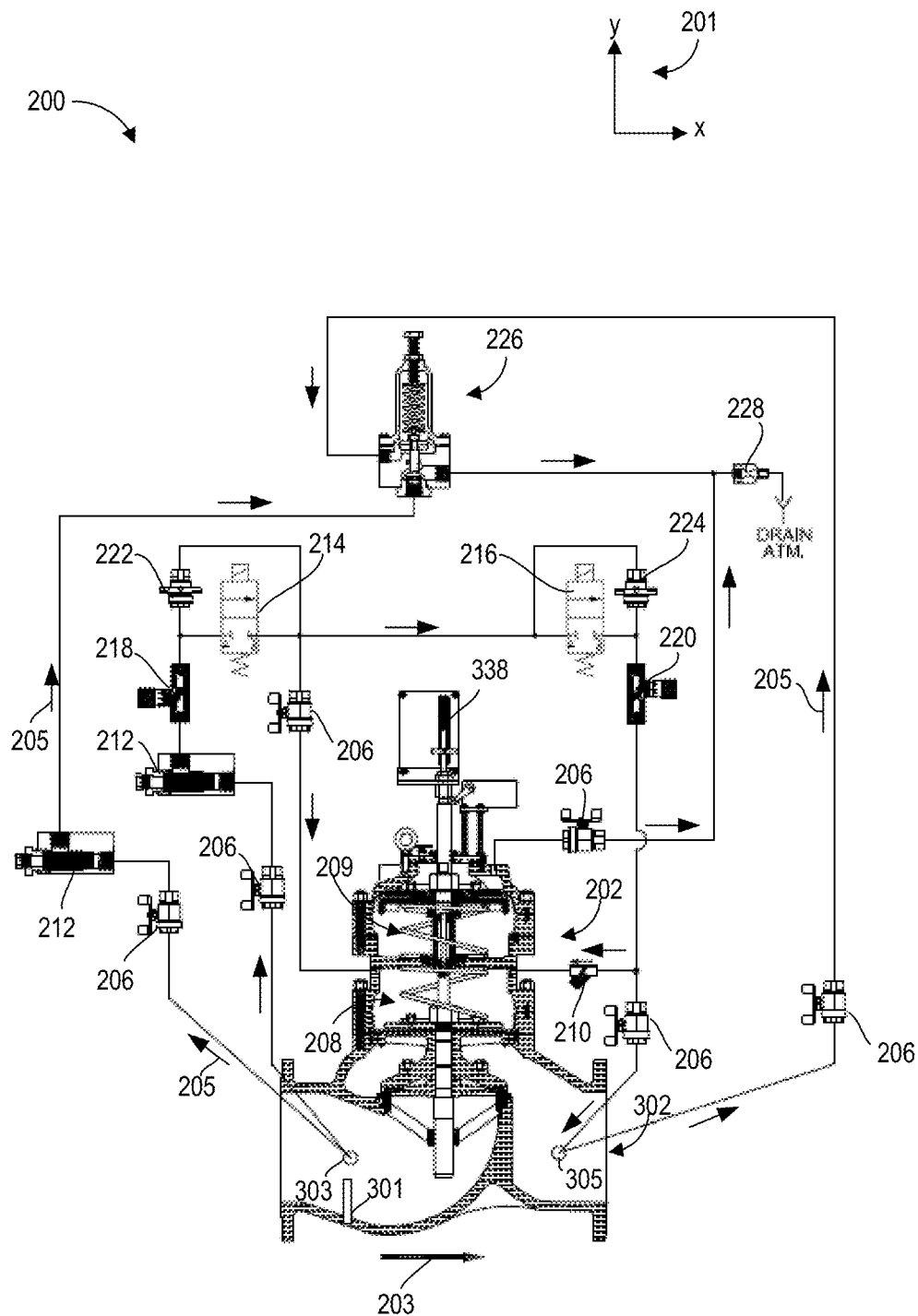
FIG. 2 shows a schematic diagram of an example of a dual valve which may be used to control flow and pressure in the fluid flow arrangement of FIG. 1.
Figure 5:
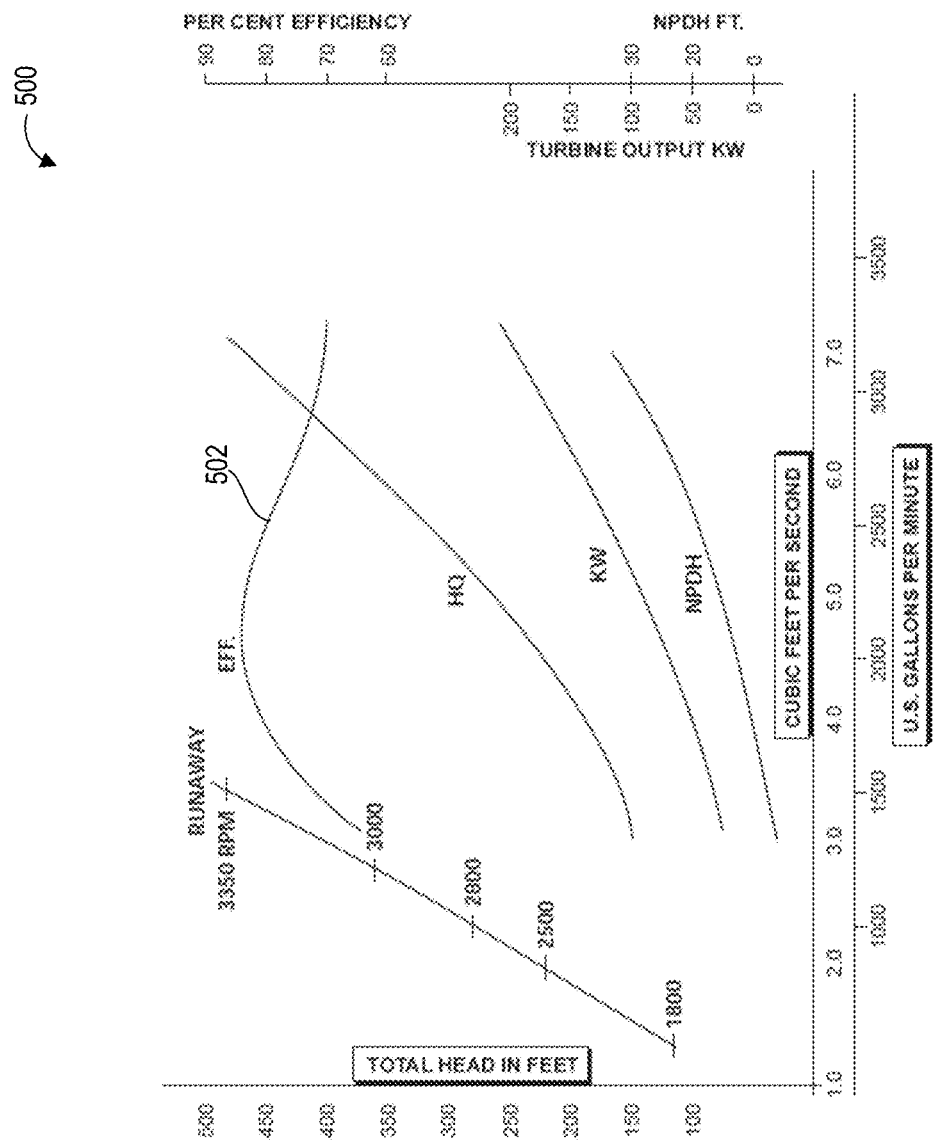
FIG. 5 shows a graph depicting a turbine efficiency curve.
Figure 6A:
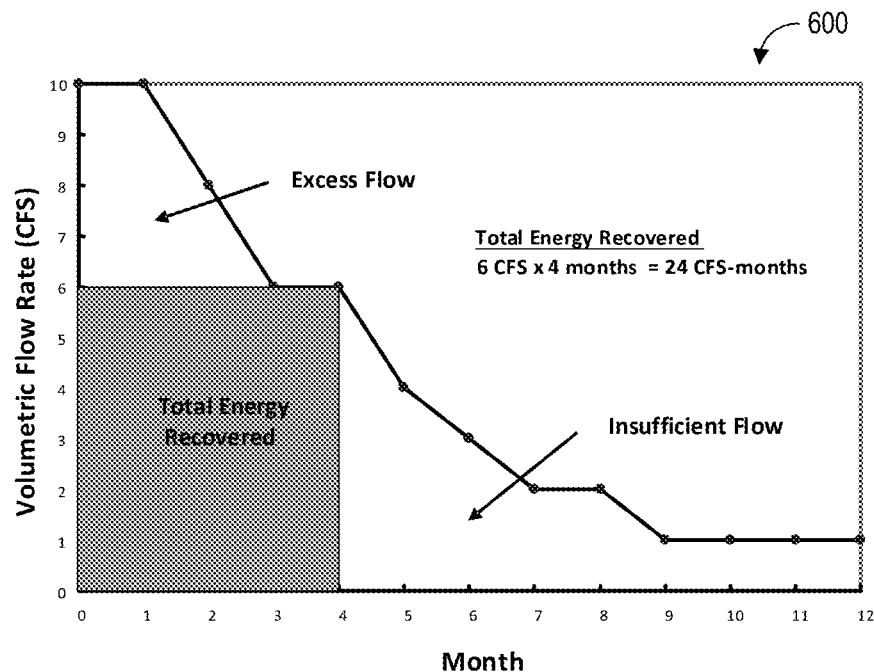
FIG. 6A shows a flow duration curve for a fluid flow arrangement adapted with a single turbine.
Figure 6B:
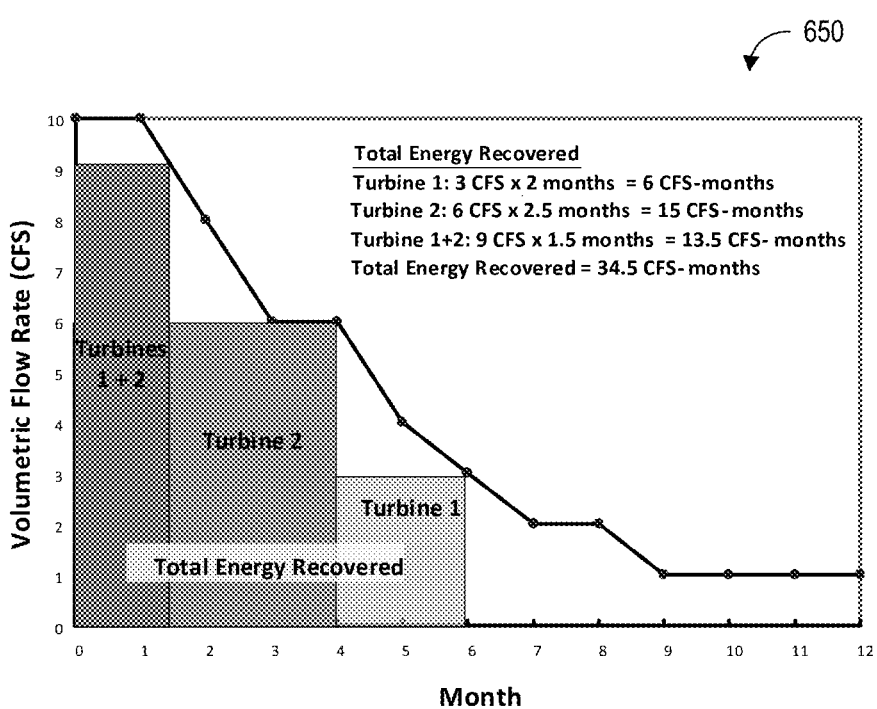
FIG. 6B shows a flow duration curve for a fluid flow arrangement adapted with more than one turbine.
Figure 9A:
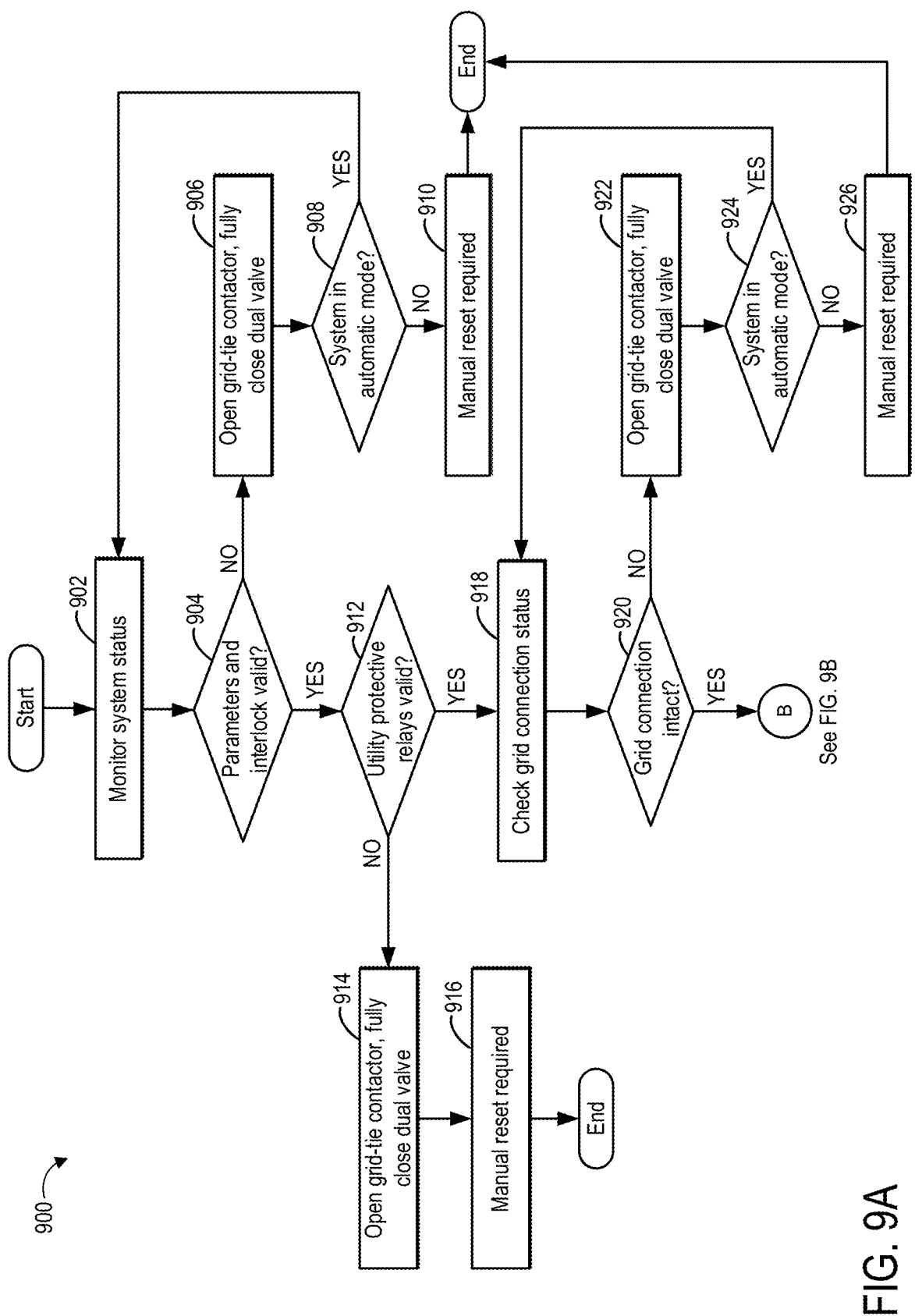
FIG. 9A shows a first portion of an example of a routine for shutting down the energy-harvesting sub-assembly of the fluid flow arrangement of FIGS. 7 and 8.
Figure 10:
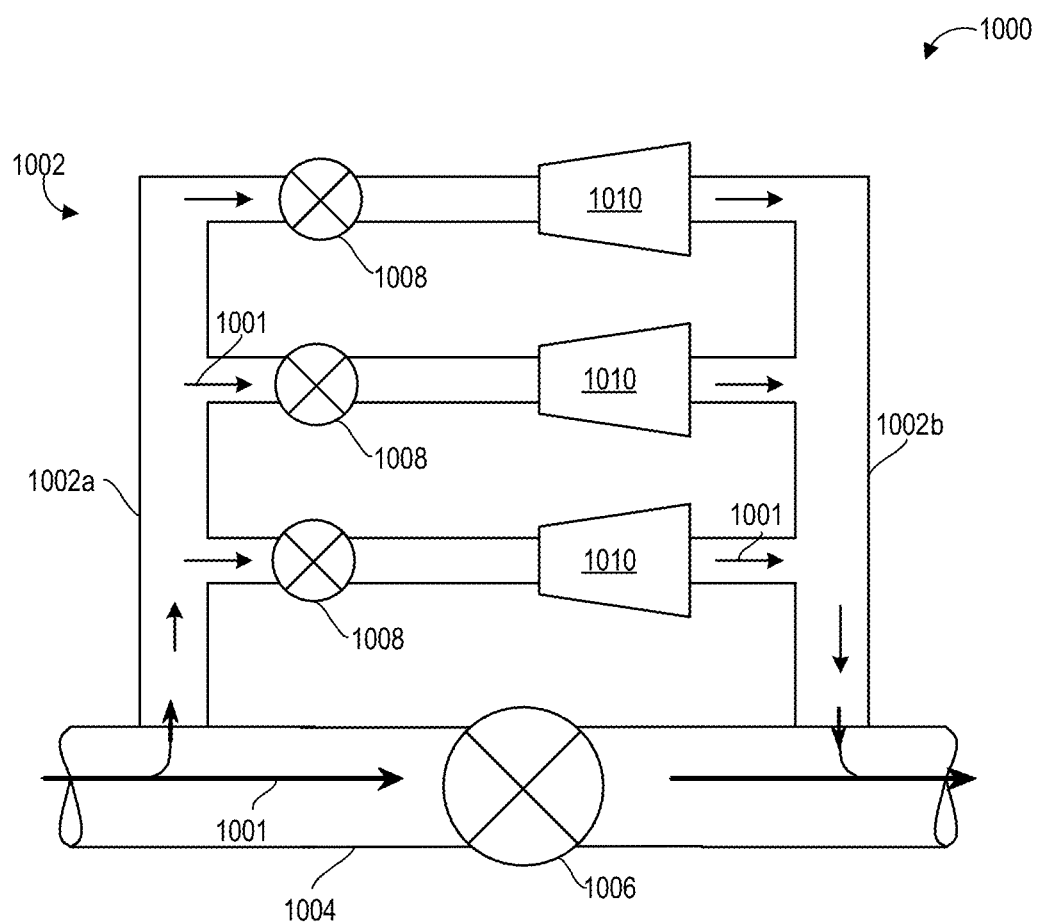
FIG. 10 shows a schematic illustration of an embodiment of the fluid flow arrangement adapted with more than one energy-harvesting sub-assembly.
Figure 11:
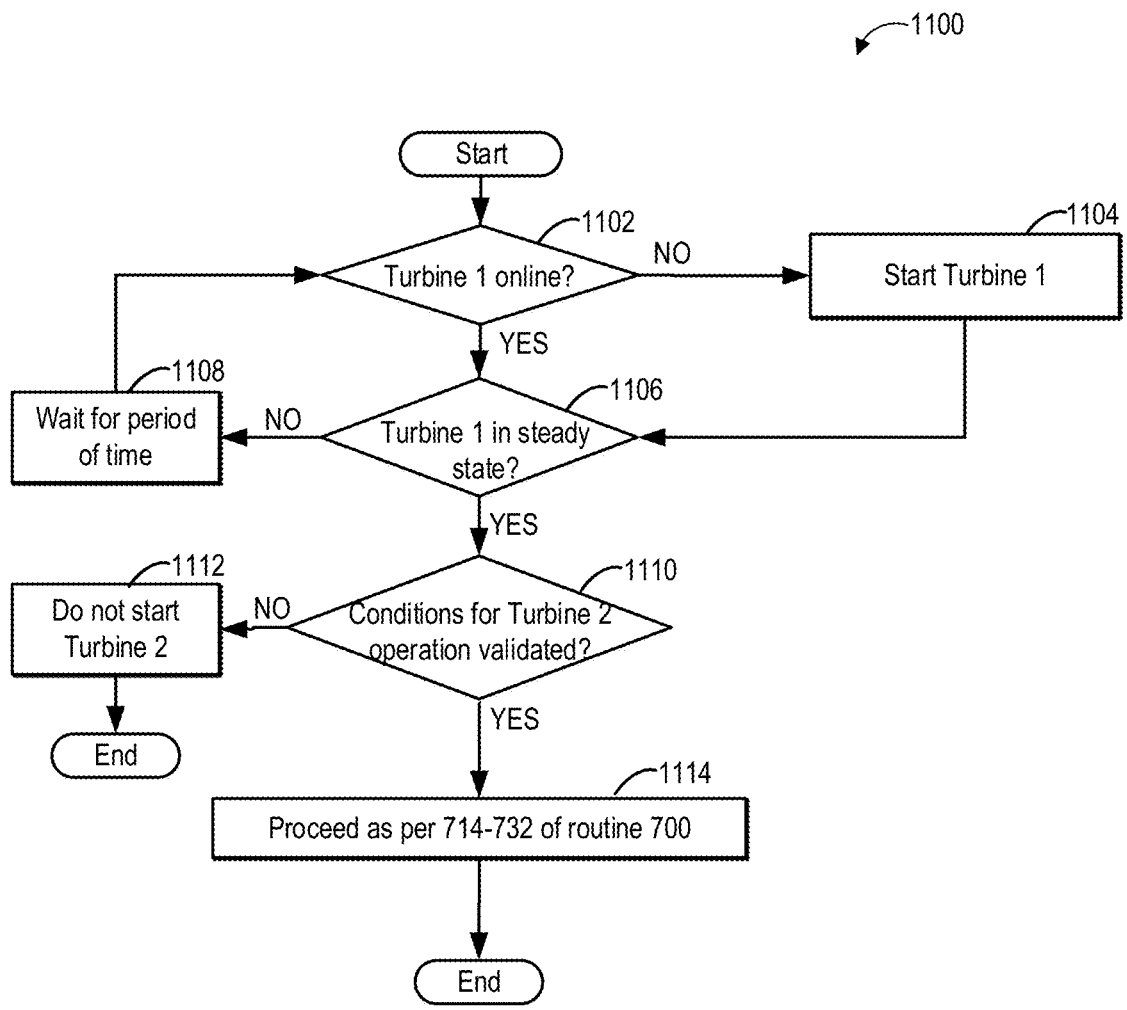
FIG. 11 shows example of a startup routine for a fluid flow arrangement with more than one energy-harvesting sub-assembly arranged in parallel with a turbine arranged downstream of a dual valve in each energy-harvesting sub-assembly.
Figure 12:
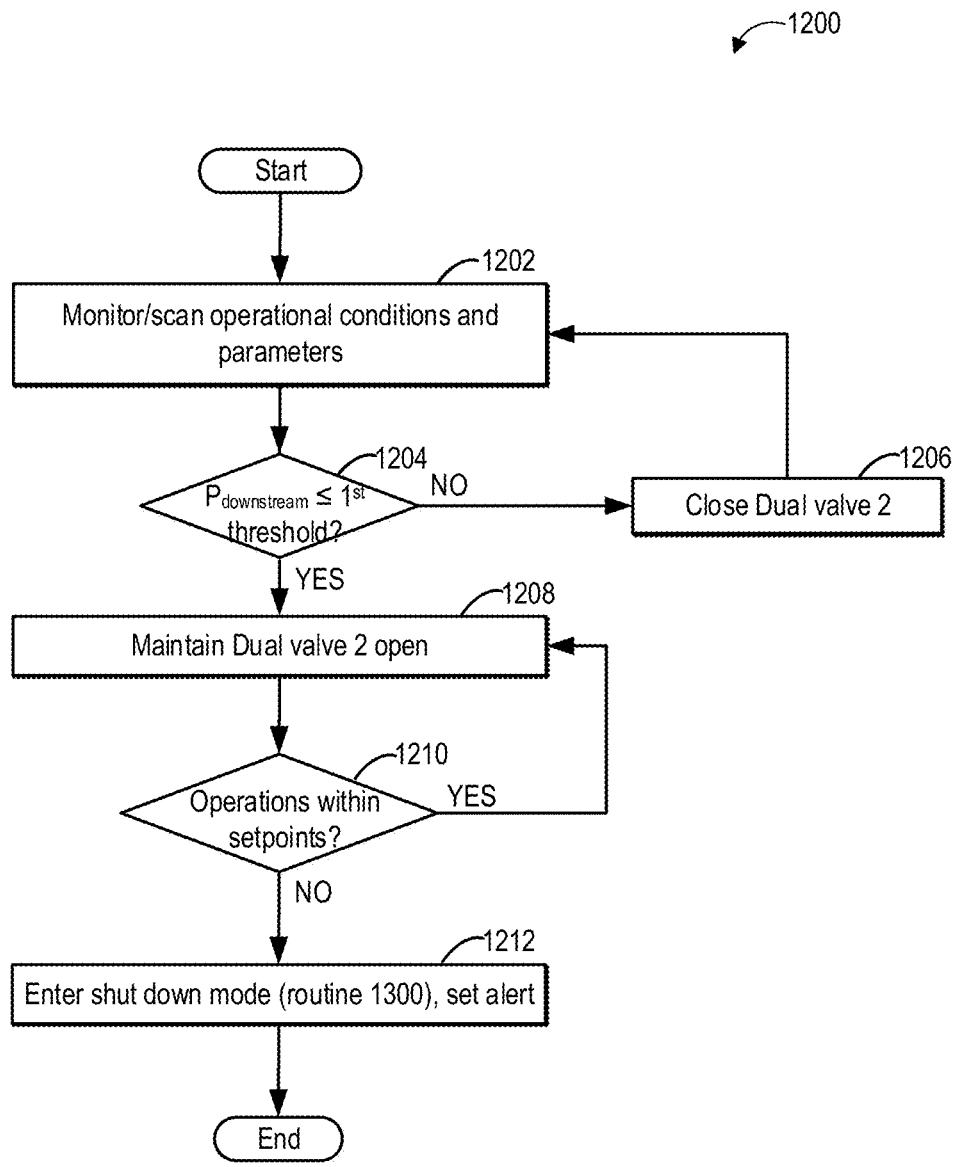
FIG. 12 shows an example of a routine for the fluid flow arrangement of FIG. 10 for operating the more than one energy-harvesting sub-assemblies in a steady state mode.
Figure 13:
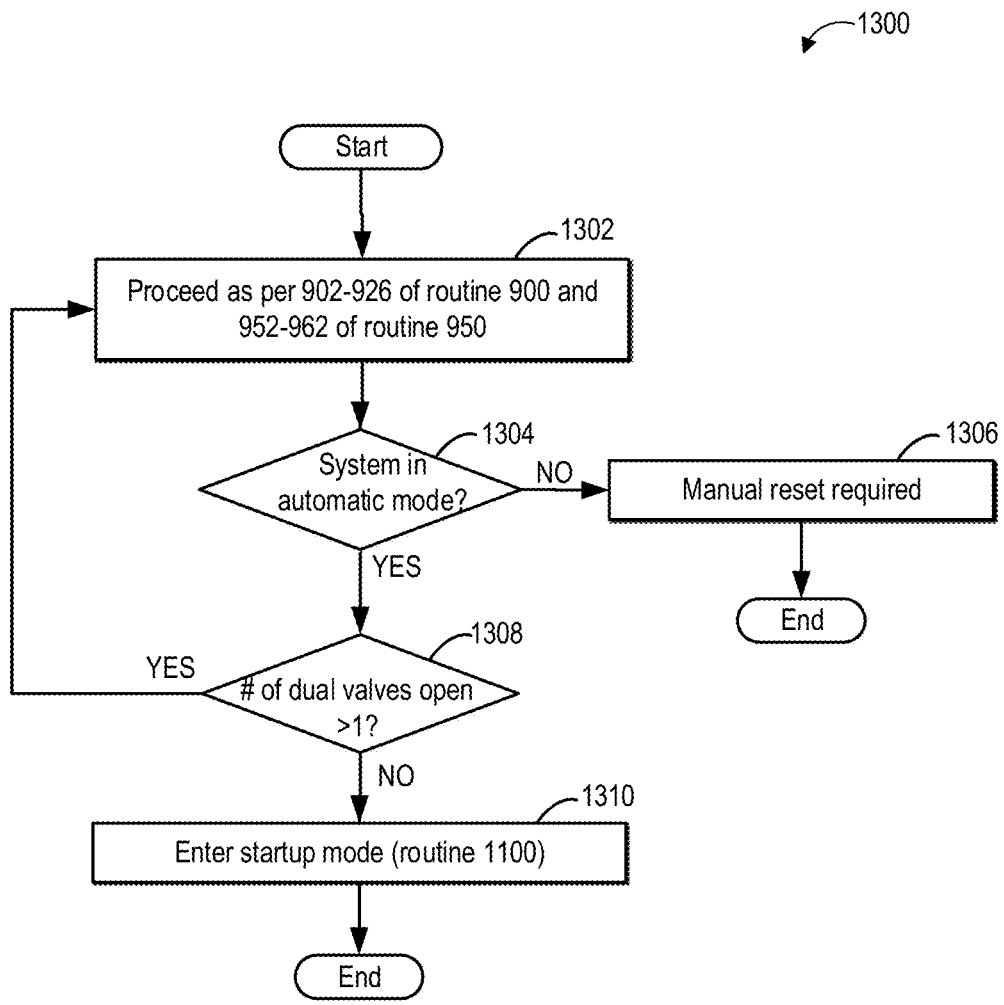
FIG. 13 shows an example of a routine for shutting down the more than one energy-harvesting sub-assemblies of the fluid flow arrangement of FIGS. 10 and 12.

The following description relates to systems and methods for a electric power-generating fluid flow arrangement to produce electricity. The fluid flow arrangement may be configured to be modular, e.g., a number of sub-systems or sub-assemblies coupled to a pipeline may be varied, and may utilize either new or existing pipelines to produce electricity from a flow of a gravity-fed and pressurized fluid. In some examples, the power-generating fluid flow arrangement may include sub-systems or sub-assemblies with a secondary fluid conduit coupled to a primary fluid conduit. The secondary conduit generally may include at least one control valve to control fluid flow and pressure through the secondary conduit. An example of a fluid flow arrangement is shown in FIG. 1 in a schematic diagram. In one example, the at least one control valve in the secondary conduit may be a dual valve providing both flow control and pressure control. An example of the dual valve is depicted in FIG. 2. The dual valve includes a primary, main valve, illustrated in detail in FIG. 3 in a cut-away view, which includes a primary operating chamber and a second operating chamber. The primary operating chamber is controlled by dual solenoid pilots while the second operating chamber is controlled by a secondary, hydraulic pilot which is illustrated in detail in FIG. 4. The operating chambers of the dual valve may operate in combination to regulate downstream pressure, e.g., downstream of an outlet of the secondary conduit, in the primary fluid conduit. In some examples, the fluid flow arrangement may be adapted with more than one sub-assembly such that more than one turbine is used to extract energy from the fluid flow through the primary conduit, where each turbine may have a similar or a different flow capacity and efficiency. A graph illustrating an example of a turbine efficiency curve is shown in FIG. 5 and flow duration curves, comparing energy recovered from a fluid flow arrangement with a single turbine with energy recovered from a fluid flow arrangement with more than one turbine, are depicted in FIGS. 6A-6B. Examples of routines for operating a fluid flow arrangement with a single sub-assembly, according to various operating modes, are shown in FIGS. 7-9B while examples of routines for operating a fluid flow arrangement with multiple sub-assemblies are shown in FIGS. 11-13. A schematic illustration of an embodiment of the fluid flow arrangement with more than one sub-assembly coupled to the primary conduit is depicted in FIG. 10.

Energy may be harvested from a fluid flow and converted into electricity by a fluid flow arrangement, e.g., a hydro-electric power-generating arrangement, that includes a main fluid flow through a primary conduit and a secondary flow through a sub-system of the fluid flow arrangement. The sub-system may be a bypass coupled to the primary conduit and configured to divert at least a portion of the main fluid flow through the bypass where a turbine is arranged. The turbine may be coupled to an electric power generator such that when fluid flows through the bypass, the turbine is rotated which rotates the generator, resulting in generation of electrical power. Generally, it is desirable to divert as much of the fluid flowing through the primary conduit into the secondary conduit and past the turbine-generator as possible so as to maximize the energy production potential. An example of the fluid flow arrangement with respect to fluid conduits and flow of power to external electrical systems is depicted in FIG. 1.

FIG. 1 schematically illustrates an example of an assembled power-generating fluid flow arrangement 100 (which may be referred to herein as arrangement 100) that generates electric power, in accordance with configurations. The arrangement 100 includes a secondary conduit 102 (which may also be referred to herein as a bypass conduit 102) coupled in parallel to a primary conduit 104 which is included in the arrangement 100. As one example, the primary conduit 104 may be a water supply pipe. The secondary conduit 102 may be included in a sub-assembly 150 of the arrangement 100, the sub-assembly 150 further including one or more control valves (e.g., control valve 114), and a turbine 116 coupled to an electric power generator 118. In one example, the sub-assembly 150 may be an energy-harvesting sub-assembly 150 of the arrangement 100, forming a loop that diverts at least a portion of the flow fluid through the primary conduit 104 at an inlet 106 of the secondary conduit 102 and returns the diverted fluid to the primary conduit 104 at an outlet 108 of the secondary conduit 102. While FIG. 1 illustrates the sub-assembly 150 positioned above the primary conduit 104, the sub-assembly 150 may be positioned relative to the primary conduit 104 in other positions, e.g., beside, below, or remote from the primary conduit 104. Example dimensions for the conduits 102, 104 include a range of 10 to 42 inches, although other diameters may be used if desired.

The arrangement 100 includes the inlet 106 and the outlet 108, which may be elements of the sub-assembly 150, defined by connection of the secondary conduit 102 to the primary conduit 104. In some examples, the arrangement 100, and the sub-assembly 150, may include an inlet valve 110 and an outlet valve 112 to allow fluid flow into and out of the secondary conduit 102, respectively.

The secondary conduit 102 includes a control valve 114 and the rotatable turbine 116. The control valve 114 may be configured to regulate flow and/or pressure of a fluid stream. In some examples, an additional control valve (not shown) may be positioned downstream of the turbine 116 and may also be a flow control or pressure control valve. Additionally, in other examples, the secondary conduit 102 may be coupled to the primary conduit 104 with the inlet 106 and the outlet 108 and the inlet valve 110 and outlet valve 112 are not included. In one example, as described herein, the control valve 114 may be a dual valve, with both flow and pressure control capabilities integrated into a single valve. Details of the dual valve, as well as control and operation of the valve, are provided further below.

The turbine 116 is connected to the electric power generator 118 such that the flow of a fluid past the turbine 116 drives the generator 118 to generate power in the form of electricity. In other words, rotational energy of the turbine 116 may be converted to electrical energy by the generator 118. Arrows 122 indicate directions of fluid flow. In some examples, a pressure reducing valve 120 may be included in the primary conduit 104. A condition or position of the pressure reducing valve 120 also affects the fluid flow in the secondary conduit 102.

Generally, the fluid, e.g., water (although the fluid may comprise other fluids), flowing through the primary conduit 104 is moved through the primary conduit 104 due to gravitational forces, e.g., a water supply is at a higher elevation relative to a delivery point or an end point of the primary conduit 104. Thus, water flows through the primary conduit 104 due to gravity. Alternatively, pressure in the primary conduit 104 may be controlled by pumps, thereby driving the flow through the primary conduit 104. Accordingly, in some examples, the pressure reducing valve 120 may be utilized to ensure that water arrives at an end location at a desired pressure. In some examples, the arrangement 100 of the secondary conduit 102, the control valve 114 and the turbine 116 may be utilized to simulate and mimic the effect of the pressure reducing valve 120 on fluid flow and pressure through the primary conduit 104.

However, in some examples, the pressure reducing valve 120 may not be included in the primary conduit 104.

During operation of the arrangement 100, fluid flows through the primary conduit 104 at a flowrate determined by total system demand. The pressure reducing valve 120 in the primary conduit 104 may be set to maintain a particular downstream pressure. As the flowrate in the primary conduit 104 increases due to increased demand for the fluid downstream of the arrangement 100, the control valve 114 in the secondary conduit 102 opens and fluid begins to flow through the secondary conduit 102. Upon opening of the control valve 114, the turbine 116 begins to spin up to operating speed, thereby turning the generator 118 to generate electricity, which may be provided to, for example, a network of electrical systems and components, including an electric grid network 136, via an electric power transmission conduit 130, or one or more batteries 126, for storage via another electric power transmission conduit 132 after being directed to a grid-tie/electrical panel 124. The grid-tie/electrical panel 124 may support various electrical components such as an inverter, transformers, switches, relays, etc. and may be coupled/decoupled from generator 118 and/or the electric grid network 136 by one or more grid-tie contactors located in a grid-tie contactor panel. The one or more grid-tie contactors may be switches used to open and close an electric circuit with large current flows and may be normally open. However, the one or more grid-tie contactors are configured to close when the generator 118 reaches a grid synchronization speed, thereby disconnecting the generator 118 from the electric grid network 136. In other examples, the generated electricity may be provided to other entities that utilize and/or store electricity.

A control system 128, and associated hardware, may be housed in a controls/electronics panel (not shown). The control system 128 manages the operation of the arrangement 100 by diverting flow from the primary conduit 104 into the secondary conduit 102 via the control valve 114. The control system 128 manages the flowrate in the secondary conduit 102 to maximize performance of the turbine 116, thus maximizing electrical output by the generator 118.

The electricity generated by the electrical generator 118 is fed via one or more electric power transmission conduits 138 to the grid-tie/electrical panel 124 where it can be provided to the electric grid network 136, via an electric power transmission conduit 130, the one or more batteries 126, for storage via another electric power transmission conduit 132, or another electrical load. However, in other examples, the generated electricity may be provided to other entities that utilize and/or store electricity.

The control valve 114, located upstream of the turbine 116 in the secondary conduit 102, regulates the flowrate entering the secondary conduit 102 and ensures operation of the turbine 116 within suitable conditions for the turbine 116, e.g., within a target pressure range. The control valve 114 also aids in ensuring that the energy generation rate of the turbine 116 is not adversely affected by upstream pressure fluctuations. When configured as the dual valve, the control valve 114 further ensures that the water returning to the primary conduit 104 is at an optimized downstream pressure. The control system 128 manages the operation of the power generating fluid flow arrangement 100 by monitoring pressure and flow in the primary conduit 104 and secondary conduit 102, which determines a position of control valve 114. The control system 128 maintains a flowrate in the secondary conduit 102 which optimizes performance of the turbine 116, thus maximizing electrical output by the generator 118.

By configuring the control valve 114 in the secondary conduit 102 as the dual valve, a necessity of using separate valves for pressure control and flow control through the secondary conduit 102 is eliminated. The dual valve may combine pressure control and flow control into a single valve, thereby reducing a footprint of the sub-assembly 150, reducing costs as a result of fewer parts and also decreasing head losses. Thus, an energy production potential of the arrangement 100 may be increased.

In order to operate as a dual valve, the dual valve may include more than one valve assembly. For example, as shown in FIG. 2 in a cut-away, exploded view, a dual valve 200 for a fluid flow arrangement, such as the arrangement 100 of FIG. 1, may include a valve body 202 which, in one example, may be the control valve 114 of FIG. 1. The valve body 202 has a primary chamber 208, modulated by a primary pilot system including solenoid pilot valves, and a secondary chamber 209, arranged above the primary chamber 208 and modulated by a second pilot system including a pressure-reducing pilot valve. The primary chamber 208 is configured to control flowrate through the dual valve 200 and therefore through a bypass conduit such as the bypass conduit 102 of FIG. 1, while the secondary chamber is configured to monitor and control pressure downstream of a turbine in the bypass conduit, e.g., the turbine 116 of FIG. 1. A plurality of fluid passages, depicted as connecting lines in FIG. 2, may couple the components of the dual valve 200 to one another. A set of reference axes 201 are provided, indicating a y-axis and an x-axis. In one example, the y-axis may be parallel with a direction of gravity. A direction of fluid flow in the bypass conduit is indicated by arrow 203 and fluid flow through the dual valve 200 is indicated by arrows 205. A plurality of isolating valves 206 may be disposed throughout the dual valve 200, configured to adjust fluid flow through the dual valve 200.

The dual valve 200 includes a check valve 210, and strainers 212. The check valve 210 may provide unidirectional fluid flow into the valve body 202 and the strainers 212 may remove particulate matter from the fluid flow through the dual valve 200. The dual valve 200 further includes components configured to control flow through the primary chamber 208. The components include a first, closing solenoid pilot valve 214 and a second, opening solenoid pilot valve 216. The first and second solenoid pilot valves 214, 216 are controlled by the control system and a speed at which the solenoid pilot valves are open and closed are adjusted by a closing speed control 218 and an opening speed control 220, respectively. The opening and closing speed controls 218, 220 may be manually adjustable needle valves. A bypass may be arranged around each of the solenoid pilot valves to divert fluid flow around the solenoid pilot valves. For example, a manual closing solenoid bypass 222 may route fluid flow around the first solenoid pilot valve 214 when the manual closing solenoid bypass 222 is adjusted open and a manual opening solenoid bypass 224 may route fluid flow around the second solenoid pilot valve 216 when the manual opening solenoid bypass 224 is adjusted open.

Figure 3:
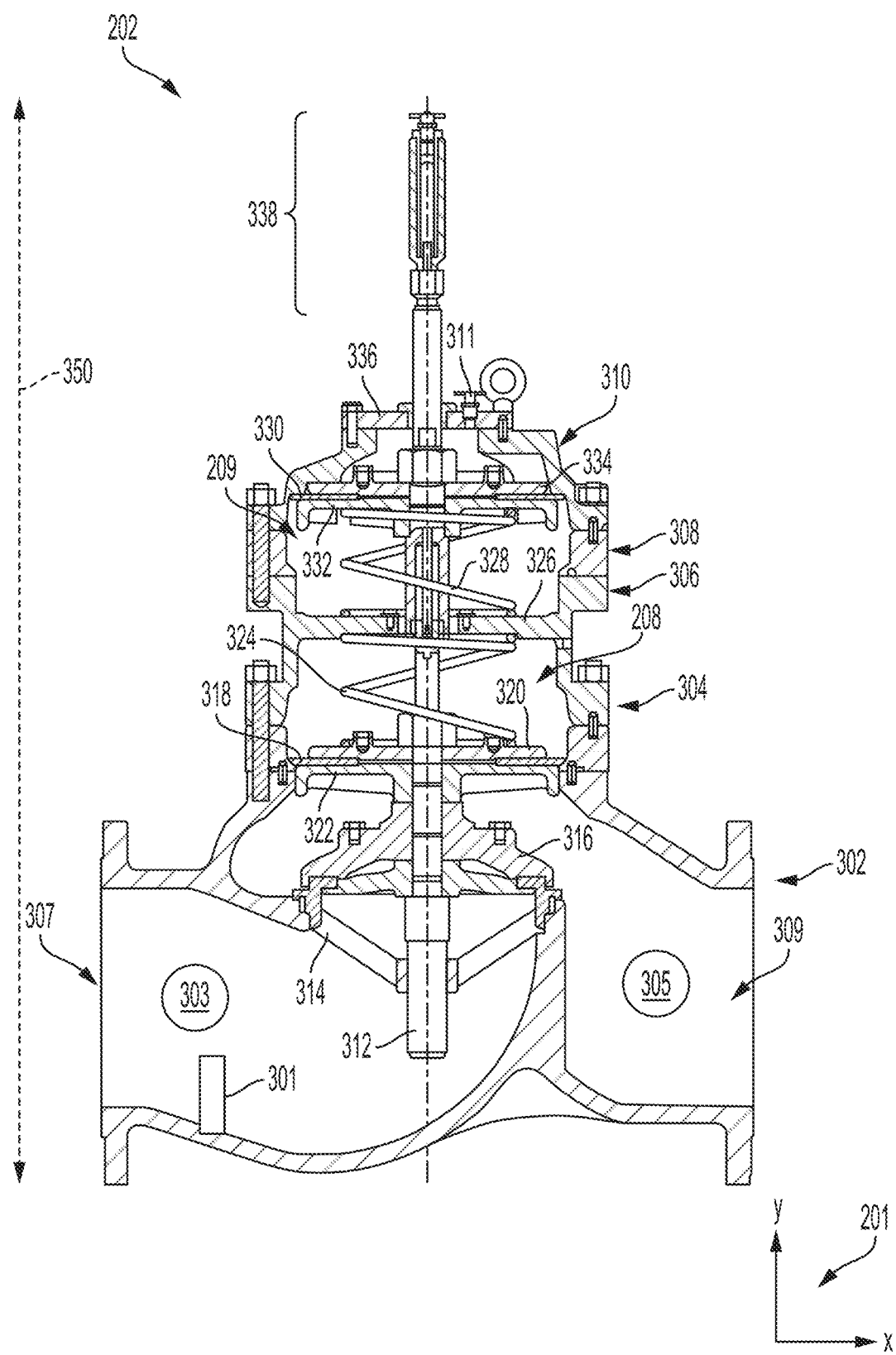
FIG. 3 shows a detailed schematic diagram of a valve body of the dual valve of FIG. 2.

The valve body 202 is shown in greater detail in FIG. 3. A lower portion, with respect to the y-axis, of the valve body 202 may be enclosed in a body 302 which may be formed of a metal such as ductile iron, as one example. Components stacked above the body 302 include a first cylinder 304 directly above the body 302, a floor plate adaptor 306 directly above the first cylinder 304, a second cylinder 308 directly above the floor plate adaptor 306, and a bonnet 310 positioned directly above the second cylinder 308. Each of the stacked components may be formed of a similar material as the body 302 and provide an outer frame or casing for the valve body 202.

A flowmeter 301 may be arranged in an inlet 307 of the body 302 (and of the valve body 202) to measure a flowrate of fluid entering the inlet 307. In one example, the flowmeter 301 may be a single point insertion flowmeter. Pressure sensors may also be provided in the body 302 of the valve body 202 to measure pressures at the inlet 307 and an outlet 309 of the valve body 202. For example, a first pressure sensor 303 may be positioned in the inlet 307 of the body 302 and a second pressure sensor 305 may be positioned in the outlet 309 of the body 302. The first and second pressure sensors 303, 305 may be communicatively coupled to the control system.

The body 302 may also enclose a lower portion of a stem 312, the stem 312 extending up and through an entire height 350 of the valve body 202, and a bottom guide 314 coupled to the stem 312. The stem 312 may be inserted through an opening in an inner valve 316 which is also enclosed within the body 302. The body 302 may be coupled to the first cylinder 304 by various fasteners, e.g., bolts, pins, clamps, etc.

The first cylinder 304 may enclose the primary chamber 208, including a first diaphragm 318 arranged between a first clamp plate 320 and a first piston 322 positioned at a bottom of the primary chamber 208. A position of the first diaphragm 318 may regulate an amount of fluid flowing through the dual valve 200 where the position of the first diaphragm 318 is maintained in part by a first spring 324 also enclosed by the first cylinder 304. The first spring 324 may wind around the stem 312 and extend between the first clamp plate 320 and a floor 326 of the floor plate adaptor 306. The first spring 324 may be configured to oppose a force exerted on the first diaphragm 318 by the first piston 322.

A second spring 328 may be enclosed within the secondary chamber 209 which is separated from the primary chamber 208 by the floor 326 of the floor plate adaptor 306. The floor plate adaptor 306 and the second cylinder 308 and may also wind around the stem 312. The second spring 328 may assist in maintaining a position of a second diaphragm 330 arranged above the second spring 328 and sandwiched between a second piston 332 and a second clamp plate 334 at a top of the secondary chamber 209. The position of the second diaphragm 330 may moderate a flow through the secondary chamber 209, where the position of the second diaphragm is controlled by a pressure-reducing pilot valve, described further below. The second clamp plate 334 is positioned inside of the bonnet 310 and the bonnet 310 may be sealed by a top cover 336 adapted with a bleed valve 311. The top cover 336 includes an opening through which an upper portion of the stem 312 extends. The stem 312 protrudes out of the top cover 336 and may be coupled to a valve position indicator 338. The valve position indicator 338 may be communicatively coupled to the control system and configured to send a signal to the control system in real-time indicating a position of the valve body 202 which may be correlated to a volume of fluid flowing through the valve body 202.

It will be appreciated that the valve body 202 includes various additional components, such as fasteners, supports, and couplings that are not described herein. Configurations and locations of the additional components may vary without affecting operation of the valve body 202 and without departing from the scope of the present disclosure. Furthermore, components of the valve body may be formed from a variety of materials. For example, components configured to be rigid and durable may be formed from glass and/or metals such as ductile iron, stainless steel, cast iron, etc., and components in which greater flexibility is desirable (e.g., diaphragms, seals, gaskets, etc.) may be formed form materials such as nitrile rubber, ethylene propylene diene monomer rubber, or other polymers.

Returning to FIG. 2, the dual valve 200 further includes a pressure-reducing pilot valve 226 and a fixed flow restriction 228 which may drain excess fluid, e.g., fluid contributing to pressure above a threshold pressure, to atmosphere. The pressure-reducing pilot valve 226 may be a hydraulic pilot valve coupled to the secondary chamber 209 and may provide mechanical control of downstream pressure, e.g., pressure in the bypass conduit downstream of the turbine, via the secondary chamber 209. Fluid flowing out of the secondary chamber 209 may be directed to the fixed flow restriction 228. The primary chamber 208 may be in an open configuration (e.g., a position of the first diaphragm 318 is adjusted by the first and second solenoid pilot valves 216, 218 to enable fluid to flow through the primary chamber 208) during operation of the dual valve 200 within a target generator synchronous speed range. During such operation, the secondary chamber 209 may be in a closed configuration, e.g., the position of second diaphragm 330 blocks flow into the secondary chamber 209, as moderated by the pressure-reducing pilot valve 226.

Figure 4:
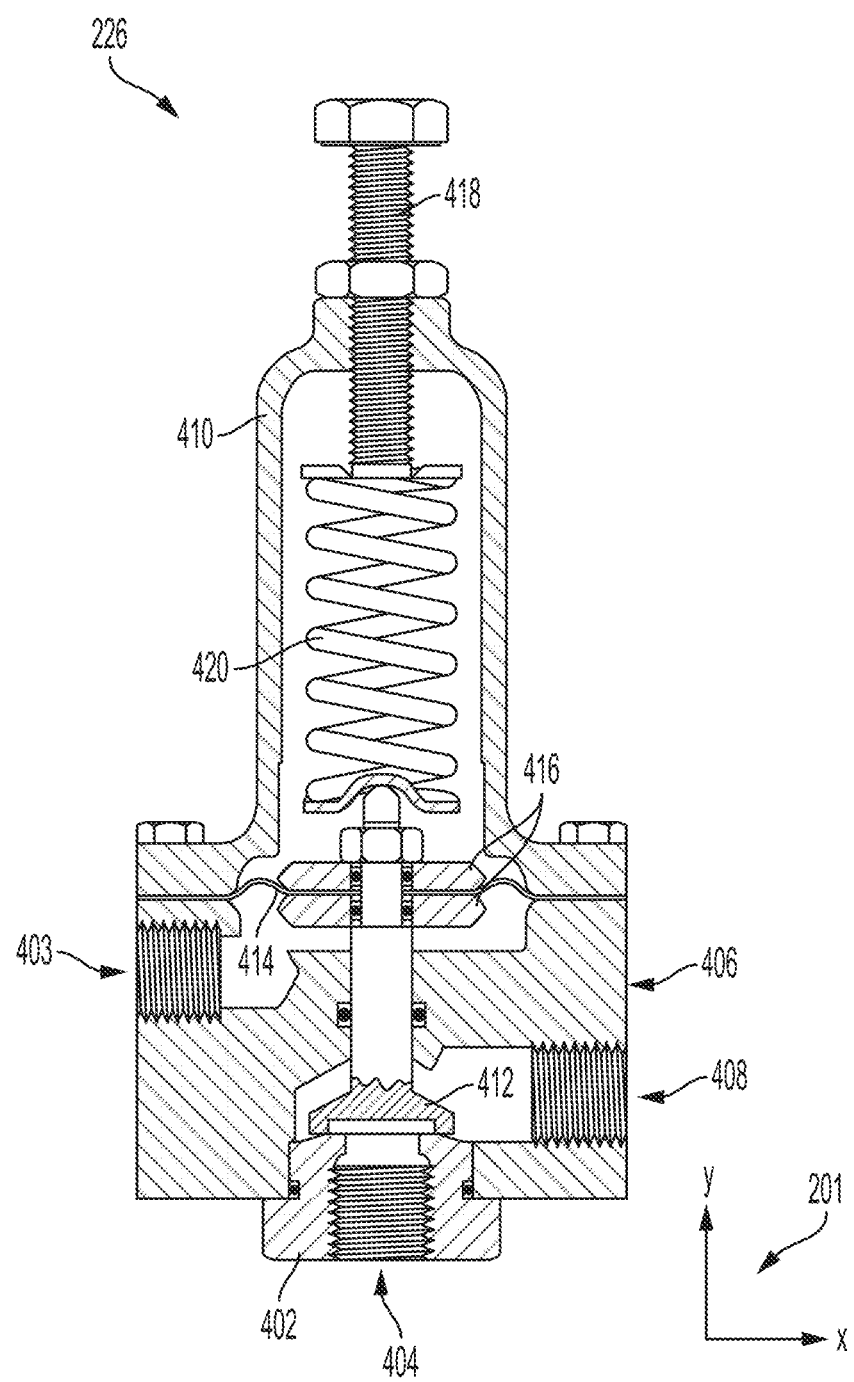
FIG. 4 shows a detailed schematic diagram of a pilot valve of the dual valve of FIG. 2.

The pressure-reducing pilot valve 226 is shown in greater detail in FIG. 4. Components of the pressure-reducing pilot valve 226 forming an outer casing of the pressure-reducing pilot valve 226 include a seat ring 402 at a bottom end (with respect to the y-axis) of the pressure-reducing pilot valve 226 surrounding an inlet 404 of the pressure-reducing pilot valve 226 and arranged in an opening of a body 406. The body 406 is above the seat ring 402 and may include an outlet 408 of the pressure-reducing pilot valve 226. The body 406 may also include a sensing port 403 configured to receive a sensing line coupled to a pressure sensor at an outlet of the turbine. The outer casing further includes a spring casing 410 located above the body 406 and coupled to the body 406 by fasteners. The outer casing of the pressure-reducing pilot valve 226 may be formed from different metals and metal alloys such as brass, bronze, stainless steel, etc. The pressure-reducing pilot valve 226 may also include various fasteners, couplings, and seals not described herein for brevity.

An inner valve 412 is enclosed by the body 406. A position of the inner valve 412, e.g., along the y-axis, may control an amount of fluid flowing into the pressure-reducing pilot valve 226 through the inlet 404 and leaving the pressure-reducing pilot valve 226 through the outlet 408. The position of the inner valve 412 may be controlled, in part, by a diaphragm 414 located above the inner valve 412 and sandwiched between clamp plates 416. A position of the diaphragm 414 may be adjusted by an adjusting screw 418 arranged at a top of the pressure-reducing pilot valve 226 and protruding out of the spring casing 410. Rotation of the adjusting screw 418 may raise or lower the adjusting screw 418 relative to the spring casing 410 and vary an amount of force exerted on the clamp plates 416 by a spring 420 enclosed within the spring casing 410 and extending between the adjusting screw 418 and an upper plate of the clamp plates 416.

The primary chamber 208 of the valve body 202 may be maintained open during operation of the fluid flow arrangement when a pressure at the inlet 307 is at or above a threshold pressure while flow is concurrently directed off of the bonnet 310. For example, when a flowrate onto the bonnet 310 is greater than a flowrate off of the bonnet 310, a pressure on top of the bonnet increases, overcoming a spring force exerted by the first spring 324 and the primary chamber 208 of the valve body 202 is opened. Conversely, the flowrate onto the bonnet 310 is less than the flowrate off of the bonnet 310, the pressure on the bonnet 310 decreases and the primary chamber 208 is closed.

The pressure balance between the inlet 307 and the bonnet 310 may be controlled by the first and second solenoid pilot valves 214, 216. The solenoid pilot valves may be actuated by the control system which may command adjustment of the opening of the primary chamber 208 based on pressure measurements received from the various pressure sensors of the fluid flow arrangement, including the first and second pressure sensors 303, 305 of the valve body 202

The opening of the secondary chamber 209, in contrast to the primary chamber 208, is not adjustable based on commands from the control system. Instead, the opening of the secondary chamber 209 may be controlled by the pressure-reducing pilot valve 226 which is mechanically actuated based on a pressure set point and regulated by a position of the adjusting screw 418. For example, the pressure-reducing pilot valve 226 may be coupled to the bypass conduit, downstream of the turbine, by a pressure sensing line. When a downstream pressure rises above the pressure set point of the pressure-reducing pilot valve 226, the secondary chamber 209 may be opened and a portion of the fluid flow may be diverted to the secondary chamber 209 and drained to the atmosphere via the fixed flow restriction 228, thereby venting the excess pressure.

In addition, the secondary chamber 209 may provide redundancy by assuming operation of the dual valve 200 if the primary pilot system or primary chamber is degraded and no longer operational. In this way, deterioration of the main pipeline, turbine, and other hardware due to pressure surges is circumvented. Reducing pressure surges via pressure management enabled by operation of the secondary pilot system also extends a useful life of fluid flow infrastructure and increases system uptime, allowing power generation to be maximized. Furthermore, when degradation of the primary pilot system is detected, the dual valve may alert an operator that maintenance of the primary pilot system is demanded, thus reducing emergency maintenance events and system shut-downs.

By combining flow and pressure control into a single valve, the fluid flow arrangement, e.g., the fluid flow arrangement 100 of FIG. 1, may be simplified and have a reduced footprint. Implementation of the dual valve, e.g., the dual valve 200 of FIG. 2, in the fluid flow arrangement eliminates a need for a control valve downstream of the turbine in the bypass conduit. Decreasing a number of control valves in the energy-harvesting sub-assembly may reduce both head losses and an overall footprint of the bypass conduit relative to systems relying on more than one control valve to regulate flow and pressure.

Use of the fluid flow arrangement offers several benefits in addition to reduced footprint and head losses. The fluid flow arrangement may be formed of off-the-shelf components, thereby allowing scalability and configuration flexibility as well as lowered costs. The energy-harvesting sub-assembly may be retrofit to an existing pipeline or to a newly installed pipeline in a quick and cost-effective manner. For example, the energy-harvesting sub-assembly may be installed without disrupting the flow of fluid in the primary conduit using an operating method such as hot-tapping.

Furthermore, a modularity and compactness of the fluid flow arrangement allows multiple energy-harvesting sub-assemblies to be deployed, as shown in FIG. 10 and described further below, without causing disruption or variability in a downstream flowrate of the primary conduit or pipeline. By coupling multiple sub-assemblies to the primary conduit, an amount of energy extracted from the fluid flow may be maximized, both instantaneously and over time as the multiple sub-assemblies exploit more of a hydraulic opportunity at a specific installation site. Details of configuring the fluid flow arrangement with multiple sub-assemblies is provided further below with reference to FIGS. 5-6B and 10.

Additionally, an overall number of components and a complexity of the fluid flow arrangement, as a result of combining flow control and pressure control into the dual valve, is reduced relative to conventional systems. Leakage through pipeline walls, fittings, instruments, etc., may be reduced due to suppression of fluctuations and surges in fluid pressure by the dual valve. Maintenance demands may be decreased due to fewer components. Furthermore, hydraulic/operational data may be provided in real-time, allowing an operator to be immediately notified of maintenance issues to be addressed. Hence, the stability and accuracy of pressure management is enhanced.

In addition, as described above, in an event where degradation of the primary chamber and diaphragm of the dual valve, the secondary chamber, as actuated by the pressure-reducing pilot valve of the dual valve, may be operated as a failsafe to circumvent generation of a downstream pressure surge. As such, the dual valve may rely on the secondary chamber to continue controlling downstream fluid pressure, mitigating immediate manual closing of valves to isolate the bypass conduit. System downtime is thereby decreased.

A further benefit of configuring the fluid flow arrangement to be modular, e.g., more than one energy-harvesting sub-assembly may be coupled to the primary conduit, includes allowing multiple turbines to operate in parallel, as shown in FIG. 10 and described in detail further below. The turbines may have different power production capabilities. The parallel configuration of the fluid flow arrangement may increase a proportion of the primary conduit fluid flow that may be diverted to the energy-harvesting sub-assemblies to produce power. Additionally, the configuration provides flexibility in a capacity of the fluid flow arrangement to accommodate large fluctuations in flowrate through the primary conduit.

For example, high efficiency operation of turbines occurs within a narrow range of flowrates and pressures, as shown in graph 500 in FIG. 5 by a first plot 502 representing a turbine efficiency curve. It is desirable to operate a turbine at or near its peak, e.g., best efficiency point (BEP) to maximize an amount of energy that can be harvested and converted into electricity by a generator coupled to the turbine. Implementing multiple turbines with different BEPs and different flow capacities allows the arrangement to address seasonal changes in demand for water from a primary conduit.

As an example, in a fluid flow arrangement with a first energy-harvesting sub-assembly and a second energy-harvesting sub-assembly, where each sub-assembly is similar to the energy-harvesting sub-assembly 150 of FIG. 1, the first and second sub-assemblies are arranged in parallel with one another and also coupled in parallel with the primary conduit. The first sub-assembly may have a low flow capacity and the second sub-assembly may have a high flow capacity. During periods of low water demand from the primary conduit, water from the primary conduit may be primarily diverted to the first sub-assembly. During periods of increased, moderate water demand, water from the primary conduit may instead be directed to the second sub-assembly. At times of high water demand, e.g., a flowrate through the primary conduit is high, water from the primary conduit is diverted to both the first and second sub-assemblies, thereby maximizing power generation from the energy-harvesting sub-assemblies across a range of flowrates through the primary conduit. Furthermore, incorporating turbines with different flow capacities to harvest energy from a variable flow may enable operation of each turbine closer to its BEP.

Benefits, with respect to energy production gains, obtained through use of two turbines arranged in parallel in a fluid flow arrangement, are depicted in graphs 600 and 650 of FIGS. 6A and 6B, respectively. The graphs 600, 650 show flowrate along the y-axis versus time along the x-axis, e.g., flow duration curves. Graph 600 represents operation of a single turbine at a low flowrate (6 cubic feet per second (CFS)) over a period of time, yielding a maximum energy recovery of 24 CFS-months. A region of the flow duration curve of graph 600 that is above an operable range of the turbine is designated as excess flow and denotes a portion of the curve where the flowrate is too high and the turbine is unable to harvest the fluid energy. A region of the flow duration curve below the operable range of the turbine is designated as insufficient flow, where the flowrate is too low for turbine operation. An area of total energy recovered is indicated in gray, representing a harvested hydraulic opportunity of the single turbine.

In contrast, when two turbines operating in parallel at different flowrates are implemented over the same period of time, a percentage of the harvested hydraulic opportunity is increased. As shown in graph 650, an overall area of energy recovered below the flow duration curve includes a first area harvested by both of the turbines, a second area harvested by the higher flow capacity turbine (e.g., 6 CFS), and a third area harvested by the lower flow capacity turbine (e.g., 3 CFS). In total, the combination of two turbines operating in tandem generates 34.5 CFS-months of energy, an increase of over 40% compared to the single turbine for the same hydraulic opportunity.

As described above, actuation and operation of a dual valve of a fluid flow arrangement may be controlled by a control system based on signals relayed from various sensors. Routines for operating the fluid flow arrangement are given in FIGS. 7-9, and 11-13. The fluid flow arrangement of FIGS. 7-9 may be the arrangement 100 of FIG. 1, adapted with an energy-harvesting sub-assembly. The energy-harvesting sub-assembly, including a dual valve in a bypass conduit arranged parallel with and coupled to a primary conduit, coupled to an electric network with various electrical systems, as shown in FIG. 1. FIGS. 11-13 show routines for operating an embodiment of the fluid flow arrangement with more than one energy-harvesting sub-assembly, as shown in FIG. 10.

Instructions for carrying out the routines shown in FIGS. 1-9, and 11-13, and the rest of the methods included herein may be executed by the control system based on instructions stored on a memory of the control system and in conjunction with signals received from sensors of the fluid flow arrangement, such as the sensors described above with reference to FIGS. 2-4. The control system may employ actuators of the fluid flow arrangement to adjust fluid flow and pressure, according to the methods described below.

Figure 7:
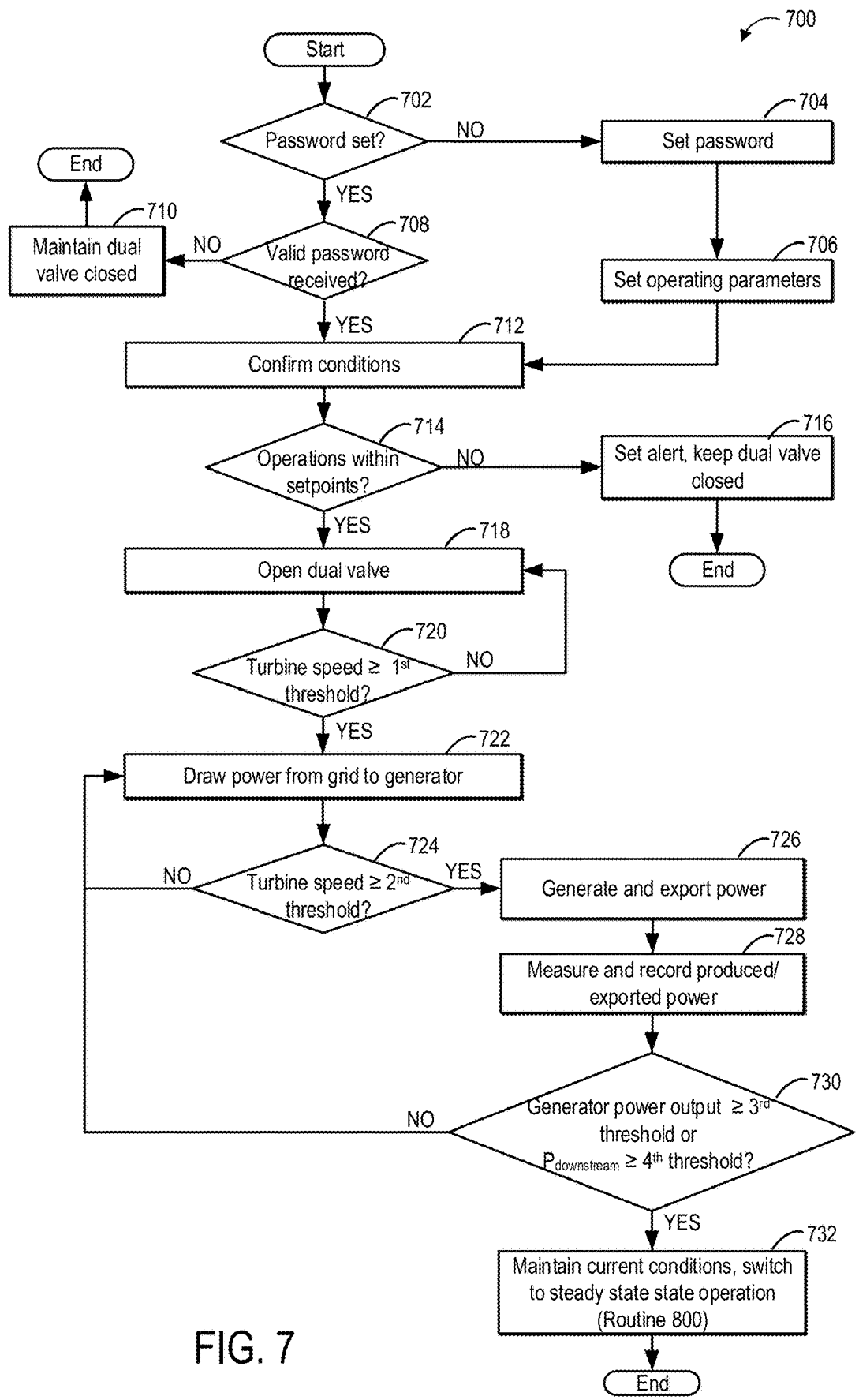
FIG. 7 shows an example of a startup routine for a fluid flow arrangement including an energy-harvesting sub-assembly.

FIG. 7 shows a routine 700 for setting up and starting up the fluid flow arrangement. Prior to startup, the dual valve may be in a closed position. At 702, the routine 700 includes confirming if a password for the control system has been set by an operator. For example, a password may not yet be set when the fluid flow arrangement is newly installed. Alternatively, the fluid flow arrangement may have already undergone an initial setup procedure with a password already established.

If the password is not yet set, routine 700 continues to the initial setup procedure which includes setting an operator-defined password at 704. The password may be entered at a user interface of the control system and saved into the memory of the control system. The initial setup procedure also includes, at 706, setting operating parameters of the fluid flow arrangement. Values for parameters such as set points for pressure and flow, maximum turbine speed, generator voltage and power output, etc., may be selected at the user interface and saved into the control system memory. The routine proceeds to a startup routine beginning at 712.

Returning to 702, if the password is set, the routine proceeds to 708 to determine if a valid password is received. For example, the control system may compare a password entered at the user interface to one or more passwords stored in the control system memory. If the entered password does not match one of the one or more stored passwords, the routine includes maintaining the dual valve closed at 710, e.g., the startup routine is not initiated. The routine ends. In some examples, a threshold number of password attempts may be allowed before the startup routine is aborted.

If the entered password matches one of the one or more stored passwords, the routine continues to 712 to confirm that system conditions of the fluid flow arrangement are within target ranges and/or at suitable settings for operation of the fluid flow arrangement. For example, the control system may confirm whether control power and grid power are available, whether any system faults are detected and whether the system, e.g., the operating system of the fluid flow arrangement, is in an auto or manual mode. The control system may also verify that all system interlocks are enabled and valid, and verify that flow in the bypass conduit is at 0 GPM (as measured by a flowmeter such as the flowmeter 301 of FIGS. 2 and 3), a speed of a turbine coupled to the bypass conduit is at 0% as determined by an RPM transmitter coupled to the turbine shaft, turbine power output is at 0 kW, as measured by a current transmitter in a grid-tie contactor panel, a grid-tie contactor is in an open state, and a generator protection relay is in a ready state.

At 714, the routine includes validating system configurable, e.g., selected and/or defined by an operator, set point measurements, e.g., the set points selected by the operator during the initial set up procedure. Parameter measurements may be compared to the configurable set points. For example, a pressure in the secondary conduit, as measured by a pressure sensor arranged upstream of or in the dual valve, may be confirmed to be above a configurable minimum threshold pressure, a pressure downstream of the turbine, as measured by a pressure sensor arranged downstream of the turbine outlet, is at or below a configurable threshold pressure with a configurable dead band value, and fluid flow through the secondary conduit, as measured by a flowmeter in the conduit, is at or above a configurable threshold flow. Other configurable set points may include a maximum power output of a generator, a maximum speed of a turbine and of the generator, amongst other parameters. The parameters may be measured at a target frequency, such as every 0.5 seconds or less.

If one or more of the operational parameters are not within desired and/or target ranges/values, the routine proceeds to 716 to set an alert to indicate the invalid parameter. The dual valve is maintained closed (e.g., a primary chamber of the dual valve is closed). The routine ends. However, if all of the operational parameters are within the target ranges/values, the routine continues to 718 to open the dual valve. Opening the dual valve includes commanding actuation of solenoid pilot valves to modify an opening of a primary chamber of the dual valve and opening of the dual valve may be continuously increased until a command to stop is relayed, as described below. Furthermore, as the dual valve is opened, the turbine and a generator coupled to the turbine begin to spin. As the dual valve opening increases, the turbine and generator speeds increase.

At 720, the routine includes determining if a speed of the turbine reaches a first threshold. Alternatively, a speed of the generator may be monitored. The first threshold may be a target percentage of a synchronous speed of the generator. In one example, the first threshold may be 98% of the synchronous speed of the generator. If the turbine/generator speed does not reach the first threshold, the routine returns to 718 to continue increasing the opening of the dual valve. If the turbine/generator speed reaches the first threshold, the routine continues to 722 to connect the generator to the electric grid network via the grid-tie contactor, e.g., the control system instructs the grid-tie contactor to close into the grid network. The generator utilizes the connection to draw excitation power from the grid network.

As the opening of the dual valve continues to increase, at 724, the routine includes determining if the speed of the turbine and generator reaches a second threshold. In one example, the second threshold may be 100% of the synchronous speed. If the turbine and generator speeds do not reach the second threshold, the routine returns to 722 to continue drawing power from the grid and continue increasing the dual valve opening. If the turbine and generator reach the second threshold, power generated by the generator is exported to electrical systems such as an on-site electric load or an electric grid or stored in one or more batteries at 726. The exported power quantity is measured and recorded, e.g., stored in the control system memory, at 728.

At 730, the routine includes determining if the power output of the generator reaches a third threshold. The third threshold may be the configurable maximum power output set point of the generator, as described above at 714. Alternatively, the routine may determine if the pressure in the bypass conduit downstream of the dual valve reaches a fourth threshold. The fourth threshold may be a configurable maximum downstream pressure. If neither the third threshold or the fourth threshold are met, the routine returns to 722 to continue drawing from the grid network to excite the generator. If at least one of the third or fourth thresholds are reached, the routine continues to 732 to maintain operation at the current conditions and switch to steady state operation (see FIG. 8).

Maintaining operation at the current conditions includes halting adjustment of the dual valve opening, e.g., the opening is no longer increased. As a result, steady flow and pressure in the bypass circuit downstream of the dual valve is achieved and maintained. The routine ends and the control system proceeds to a steady state routine as described below.

Figure 8:
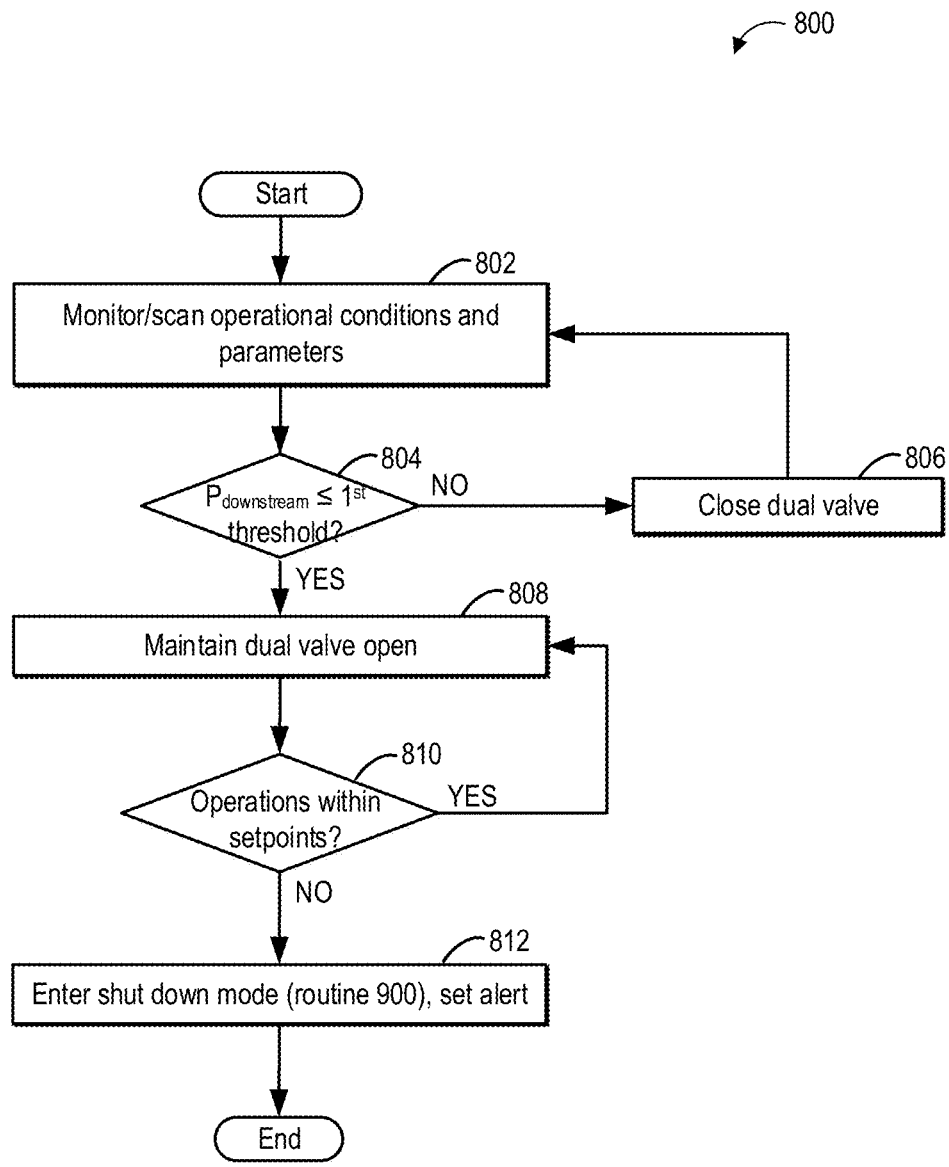
FIG. 8 shows an example of a routine for the fluid flow arrangement of FIG. 7 for operating the energy-harvesting sub-assembly in a steady state mode.

As shown in FIG. 8, routine 800 is a routine for steady state operation of the fluid flow arrangement. At 802, the routine includes monitoring and scanning system conditions as per 712 and operational parameters as per 714 of routine 700 while the fluid flow arrangement is operating and generating electrical energy from the pressurized fluid flow. The routine includes determining if a downstream pressure, e.g., a pressure in the bypass conduit downstream of the turbine, is less than or equal to a first threshold at 804.

The first threshold may be a configurable pressure set point for the bypass conduit, downstream of the turbine. If the downstream pressure is greater than the pressure set point, the routine proceeds to 806 to close the dual valve, e.g., close the opening of the main valve of the dual valve. Power production is reduced and the downstream pressure decreases. The routine returns to 802 to monitor and measure the parameters.

If the downstream pressure is equal to or less than the first threshold, the routine continues to 808 to maintain the dual valve open. Fluid continues to flow through the main valve of the dual valve with the flowrate governed by a pressure differential across the turbine. In one example, as a result of the downstream pressure being below the first threshold, the opening of the dual valve may be adjusted to a position to enable maximum power output at the turbine and generator. The PRV of the primary conduit, if present, may compensate for an increased pressure demand. A pressure set point of the PRV may therefore be set lower than the pressure set point of the dual valve to circumvent system oscillations.

At 810, the routine includes validating system configurable conditions and set point measurements. Parameter measurements may be compared to operator-defined set points, as described above with reference to 712 and 714 of routine 700. If all operations are within their respective set points, the routine returns to 808 to continue operation with the dual valve open. If one or more of the parameters falls outside of its respective set point, the routine proceeds to 812 to enter a shutdown mode, as shown in FIG. 9. An alert may be set to indicate which operation has exceeded its set point and/or provide notification of imminent deactivation of the fluid flow arrangement. The routine ends.

A routine 900 for shutting down the fluid flow arrangement is shown in FIG. 9, either as requested by an operator, e.g., manually, or in response to a detected issue, e.g., automatically. At 902, the routine includes monitoring a system status as per 712 and 714 of routine 700. The routine includes determining if the operational parameters and system interlocks are valid at 904. If one or more of the operational parameters and/or system interlocks are found to be invalid, the routine continues to 906 to open the grid-tie contactor, disconnecting the generator from the electrical grid network, and fully closing the dual valve (e.g., closing the primary chamber of the dual valve).

At 908, the routine proceeds to determine if the system is in the automatic mode. If confirmed to be in the automatic mode, the routine returns to 902 to monitor the system status. If the system is not in the automatic mode, the routine continues to 910 to indicate that a manual reset is required. The routine ends.

Returning to 904, if the operational parameters and system interlocks are validated, the routine continues to 912 to determine if utility protective relays of the system are valid. The utility protective relays are configured to trip one or more grid-tie contactors of the fluid flow arrangement when faults are detected within an electrical circuit. Validating the utility protective relays includes confirming that no faults are present in the electrical circuit. A fault may be present when an alarm output of the utility protective relay closes which may occur when operation of the relay is degraded, including being powered off. The utility protective relay further includes an additional output wired in parallel with the alarm output which closes when the relay is tripped as a result of surpassing of any configurable, preset trip setpoints, such as Under/Over Voltage, Under/Over Frequency, Over-load, Phase Sequence, and Reverse Power. When active, the additional output may shut down the generator and inhibit automatic restart, requiring the operator to manually reset the fault. If the utility protective relays are not confirmed to be valid, e.g., the fault is present, the routine proceeds to 914 to open the grid-tie contactor and to fully close the dual valve (e.g., to close the primary chamber of the dual valve). The routine includes indicating that a manual reset is required at 916. The routine ends.

Returning to 912, if the utility protective relays are validated, the routine continues to 918 to check a status of the grid connection. Checking the grid connection status includes, at 920, confirming if the grid connection is intact by monitoring an incoming power at a Digital Power Meter. The system is intact if the incoming voltage is above a minimum, threshold value on all phases of the Digital Power Meter. Additionally, an incoming circuit breaker of the utility protective relays may be monitored for its status (e.g., open/closed). If the connection is determined to not be intact, at 922, the grid-tie connector is opened and the dual valve is fully closed. The routine proceeds to 924 to determine if the system is in the automatic mode. If the system is confirmed to be in the automatic mode, the routine returns to 918 to check the grid connection status. If the system is not in the automatic mode, the routine continues to 926 to indicate that a manual reset is required. The routine ends.

Figure 9B:
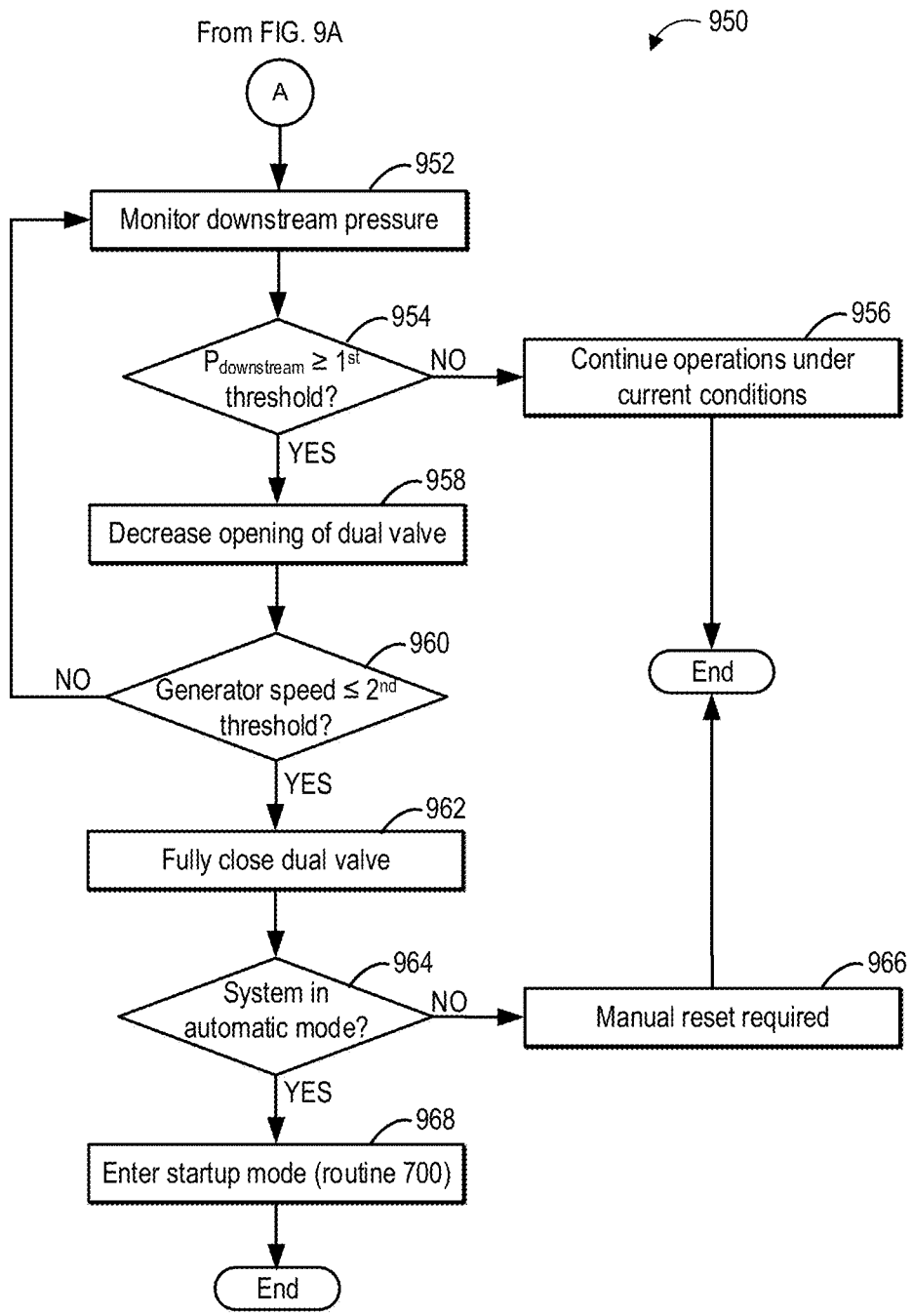
FIG. 9B shows a second portion of the routine of FIG. 9A.

Returning to 920, if the grid connection is confirmed to be intact, the routine continues to routine 950 of FIG. 9B. At 952 of routine 950, the downstream pressure in the bypass conduit is monitored and downstream pressure compared to a first threshold at 954. The first threshold may be the configurable pressure set point for the bypass conduit, downstream of the turbine. If the downstream pressure does not reach the first threshold, the routine continues to 956 to continue operations under current conditions. The routine ends.

If the downstream pressure is at least equal to the first threshold, the routine proceeds to 958 to reduce the opening of the dual valve. At 960, the routine includes determining if the generator speed is less than or equal to a second threshold. The second threshold may be, for example, 100% of the synchronous speed of the generator. If the generator speed does not fall below the second threshold, the routine returns to 952 to monitor the downstream pressure. If the generator speed reaches the second threshold, the routine continues to 962 to fully close the dual valve. The routine includes determining if the system is in the automatic mode at 964. If the system is not in the automatic mode, the routine proceeds to 966 to indicate that a manual reset is required. The routine ends.

If the system is in the automatic mode, the routine continues to 968 to enter the startup mode and execute routine 700 of FIG. 7. In this way, startup, steady state operation, and shutdown of the fluid flow arrangement are carried out in response to monitoring of operational conditions and parameters and actuation of the dual valve.

In some examples, the primary conduit may be adapted with more than one energy-harvesting sub-assembly, where multiple energy-harvesting sub-assemblies may be arranged in parallel with one another and with the primary conduit, as shown in FIG. 10. An example of a fluid flow arrangement 1000 with multiple energy-harvesting sub-assemblies is depicted in FIG. 10. Only a portion of the fluid flow arrangement 1000 is illustrated in FIG. 10 for brevity, e.g., a generator coupled to each turbine and a network of electrical systems, to which each generator is coupled, are omitted. The fluid flow arrangement 1000 includes a bypass conduit 1002 coupled to a primary conduit 1004, where the primary conduit 1004 may be adapted with a PRV 1006. Potential directions of flow through the fluid flow arrangement 1000 are indicated by arrows 1001.

The bypass conduit 1002 is split into multiple branches, each branch having a dual valve 1008, which may be the dual valve 200 of FIG. 2, for example, and a turbine 1010. The turbines 1010 may have different flow capacities and BEPs, as described above. The branches are arranged in parallel, splitting from a first portion 1002a of the bypass conduit 1002 upstream of the dual valves 1008 and merging at a second portion 1002b of the bypass conduit 1002, downstream of the turbines 1010. As such, fluid flowing into the bypass conduit 1002, as directed by opening the dual valves 1008, may be divided amongst branches where the dual valve 1008 is open (e.g., a main valve of the dual valve is adjusted open by solenoid valves).

Turning now to FIG. 11, a startup routine 1100 for a fluid flow arrangement with multiple turbines, such as the fluid flow arrangement 1000 of FIG. 10, is shown. Routine 1100 may be implemented before a first turbine is operating in a steady state mode, e.g., according to routine 800 of FIG. 8. While routine 1100 is directed to the first turbine and a second turbine, the routine may be applied to any number of turbines in a fluid flow arrangement where startup of the turbines is performed sequentially, e.g., one turbine at a time. The first turbine may be any of the turbines of the fluid flow arrangement, each turbine arranged in a branch of the bypass conduit, and the second turbine may be any other turbine other than the first turbine. It will be appreciated that references to operation of each turbine includes concurrent operation of the generator coupled to the turbine.

At 1102, the routine includes verifying if the first turbine is online. The first turbine is online when the first turbine is detected to be spinning, as measured by a transmitter on a shaft of the first turbine. If the first turbine is not online, the routine proceeds to 1104 to initiate startup of the first turbine, e.g., by opening a first dual valve arranged upstream of the first turbine as described in routine 700 of FIG. 7. The routine then continues to 1106, as described below.

If the first turbine is online, the routine continues to 1106 to determine if the first turbine is operating in a steady state mode, e.g., as according to routine 800 of FIG. 8. If the first turbine is not operating in the steady state mode, the routine includes waiting for a period of time to elapse at 1108 before returning to 1102 to confirm, again, that the first turbine is online.

If the first turbine is operating in the steady state mode, the routine continues to 1110 to determine if conditions for startup of the second turbine are within valid ranges. Validating the conditions includes, for example, confirming that the fluid flow arrangement is in an automatic mode configured for operating multiple turbines, verifying that the fluid flow arrangement has sufficient pressure and flow for supporting an additional turbine, and determining if flow through the bypass conduit is at a configurable flow set point, where the set point is specific to operation of multiple generators. The conditions to be validated may also include confirming that the second turbine is at 0% speed, and a power output of the second turbine is at 0 kW, a grid-tie contactor connected to a second generator (e.g. a generator that is coupled to the second turbine) and a protection relay of the second generator are ready.

If one or more of the conditions are not validated, the routine proceeds to 1112 where the second turbine is not started, e.g., an opening of the dual valve arranged in the bypass conduit with the second turbine is not opened or opened further to drive rotation of the second turbine. The routine ends.

If all the conditions are validated, at 1114, the routine proceeds according to 714 to 732 of routine 700. However, the execution of routine 1100 is directed to operation of a second dual valve upstream of the second turbine and at 732, continues to routine 1200 of FIG. 12 instead of routine 800 of FIG. 8. Throughout the startup sequence of the second turbine (and each additional turbine), stable operation of the first turbine may be prioritized. For example, if instability is detected at the first turbine during startup of the second turbine, the second dual valve is closed, the startup sequence is aborted. A period of time may be allowed to elapse before startup of the second turbine is attempted again. Furthermore, routine 1100 may be repeated for each additional turbine until all turbines of the fluid flow arrangement are started or at least evaluated for operation.

Routine 1200 for steady operation of the fluid flow arrangement adapted with multiple turbines is depicted in FIG. 12. The routine proceeds similar to routine 800 of FIG. 8, e.g., 1202, 1204, 1206, 1208, 1210, and 1212 of routine 1200 are analogous to 802, 804, 806, 808, 810, and 812, respectively, of routine 800. However, when operating more than one turbine in the steady state mode, the first generator is maintained at a maximum power output. Operation of the second turbine may be deactivated if insufficient flow or pressure to support operation of both turbines is detected, while continuing to operate the first turbine.

As such, the second dual valve is closed at 1206 if the downstream pressure is not equal to or below the first threshold (as described at 804 and 806 of routine 800). However, if the downstream pressure is equal to or below the first threshold at 1206, the second dual valve is maintained open at 1208. The first dual valve is maintained open unless closing the second dual valve does not sufficiently lower the downstream pressure. In such instances, the control system may execute routine 900. At 1212 of routine 1200, the fluid flow arrangement is adjusted to a shutdown mode, and proceeds to routine 1300 of FIG. 13.

Routine 1300 is a shutdown sequence for the fluid flow arrangement with multiple turbines/generators. At 1302, the routine proceeds as per 902 to 926 of routine 900 and 952 to 962 of routine 950. At 1304, the routine continues from 962 of routine 950 to verify if the system is in the automatic mode. If the system is not in the automatic mode, the routine proceeds to 1306 to indicate that a manual reset is required. The routine ends. If, however the system is in the automatic mode, the routine continues to 1308 to determine if a remaining number of open dual valves is greater than one. If the number of open dual valves is greater than one, the routine returns to 1302 to execute routines 900 and 950 for another dual valve of the fluid flow arrangement. In this way, the shutdown sequence is repeated for each open dual valve of the fluid flow arrangement until only one dual valve remains open, e.g., the first dual valve controlling the first turbine/generator.

If the number of remaining dual valves that are open is not greater than one, the routine proceeds to 1310 to enter a startup mode with the first turbine/generator operating. Pressure and flow through the bypass conduit are controlled exclusively by the first dual valve. The routine ends and the control system executes routine 1100 of FIG. 11 to restart the turbine(s).

In this way, energy may be extracted from pressurized fluid flow and converted to electrical energy via a compact and low-cost energy-harvesting sub-assembly that may be readily adapted to existing or new fluid systems. A reduced footprint of the energy-harvesting sub-assembly allows multiple generators to be coupled to a main pipeline in a fluid flow arrangement to provide electricity to an electrical network. The energy-harvesting sub-assembly includes a bypass conduit coupled to a main pipeline providing a parallel path for fluid flow. A single valve and a turbine may be arranged in the bypass conduit, the valve positioned upstream of the turbine and configured to control both flow and pressure through the bypass conduit. The valve may be a dual valve and include a primary chamber adjustable by solenoid pilot valves actuated based on instructions from a control system as well as a secondary chamber pilot valve which may be mechanically actuated by a pressure-reducing pilot valve. The dual valve may rely primarily on operation of the primary chamber to control pressure and flow in the bypass conduit, downstream of the turbine. In events where the downstream pressure rises above a threshold pressure and/or flow, the secondary chamber and pilot valve may alleviate excess pressure by venting fluid to the atmosphere. In addition, the secondary chamber and pilot valve may operate as a back-up to control pressure in the bypass conduit if the primary chamber becomes degraded. By adapting the fluid flow arrangement with the dual valve, a number of components of the arrangement and system downtime may be reduced, thereby decreasing costs and maintenance demands. A fast response time of the dual valve to changes in pressure in the fluid flow arrangement allows fluctuations and surges in the main pipe line to be avoided, thus minimizing variability in downstream pressure delivery.

The technical effect of utilizing a compact fluid flow arrangement adapted with a dual valve is that electricity may be generated at high efficiency and low cost while minimizing deviations from a target downstream pressure in a main pipeline.

The disclosure also provides support for a fluid flow arrangement, comprising: a primary conduit flowing a pressurized fluid, a bypass conduit coupled to the primary conduit to divert at least a portion of the pressurized fluid flow from the primary conduit through the bypass conduit, a dual valve arranged in the bypass conduit, the dual valve configured to control flow and pressure in the bypass conduit, and a turbine positioned in the bypass conduit and operated based on the fluid flow through the bypass conduit. In a first example of the system, the system further comprises: a generator coupled to the turbine and configured to convert rotational energy of the turbine into electricity. In a second example of the system, optionally including the first example, the generator is electrically coupled to a network of electrical systems and wherein the network of electrical systems includes a control system, a grid-tie/electrical panel, and an electric grid network. In a third example of the system, optionally including the first and second examples, the system further comprises: a control system configured with executable instructions to: start operating an energy-harvesting assembly upon confirming valid ranges of operating parameters of the energy-harvesting assembly, the energy-harvesting assembly including the bypass conduit, the dual valve, and the turbine, operate the energy-harvesting assembly in a steady state mode while maintaining a downstream pressure in the primary conduit below a first threshold pressure, and shut down the energy-harvesting assembly when the operating parameters deviate from the valid ranges. In a fourth example of the system, optionally including the first through third examples, the dual valve includes a primary chamber and a secondary chamber and wherein the primary chamber controls flow through the bypass conduit and the secondary chamber controls the pressure in the bypass conduit. In a fifth example of the system, optionally including the first through fourth examples, a rate of flow through the dual valve is adjusted by two solenoid valves actuated by a control system of the fluid flow arrangement. In a sixth example of the system, optionally including the first through fifth examples, a position of a diaphragm of the secondary chamber is adjusted based on a pilot valve with mechanical set points and wherein the pilot valve is configured to vent excess fluid to decrease pressure when the pressure in the bypass conduit rises above a second threshold pressure determined by the mechanical set points of the pilot valve. In a seventh example of the system, optionally including the first through sixth examples, the primary chamber controls the operation of the dual valve when the pressure in the bypass conduit is below a third threshold pressure. In an eighth example of the system, optionally including the first through seventh examples, the secondary chamber and the pilot valve are configured to control the pressure in the bypass conduit when the primary chamber and/or the two solenoid valves are degraded. In a ninth example of the system, optionally including the first through eighth examples, the dual valve includes a flowmeter configured to measure a fluid flowrate through the dual valve. In a tenth example of the system, optionally including the first through ninth examples, the dual valve includes a first pressure sensor arranged at an inlet of the dual valve and a second pressure sensor arranged at an outlet of the turbine and wherein the second pressure sensor is coupled to the dual valve by a sensing line.

The disclosure also provides support for a hydroelectric power-generating arrangement, comprising: one or more sub-assemblies coupled in parallel to one another and to a primary conduit, each of the one or more sub-assemblies including, a bypass conduit, a dual valve arranged in the bypass conduit and configured to control flow and pressure in the bypass conduit, and a turbine arranged in a path of fluid flow through the bypass conduit and coupled to a generator, wherein the generator is configured to provide power to an electrical network. In a first example of the system, each turbine of the one or more sub-assemblies has a flow capacity and best efficiency point and wherein each turbine of the one or more sub-assemblies adds additional flow capacity. In a second example of the system, optionally including the first example, each turbine of the one or more sub-assemblies is operated based on its respective flow capacity and a demand on the primary conduit. In a third example of the system, optionally including the first and second examples, stable operation of a first turbine of the one or more sub-assemblies is prioritized and operation of additional turbines is allowed when sufficient flow and pressure in the primary conduit is detected.

The disclosure also provides support for a method for a fluid flow arrangement, comprising: flowing a fluid through a primary conduit, diverting at least a portion of the fluid through a first bypass conduit coupled in parallel with the primary conduit, adjusting a flowrate and a pressure in the first bypass conduit by a dual valve arranged in the first bypass conduit, and operating a turbine positioned in the first bypass conduit based on the flowrate in the first bypass conduit, wherein the turbine is coupled to a generator. In a first example of the method, the method further comprises: diverting the fluid in the primary conduit through additional bypass conduits, each of the additional bypass conduits configured with a dual valve and a turbine, wherein the additional bypass conduits are coupled in parallel with the primary conduit, with the first bypass conduit, and with one another. In a second example of the method, optionally including the first example, adjusting the pressure in the first bypass conduit includes opening a secondary chamber of the dual valve via a pilot valve when the pressure rises above a set point of the pilot valve. In a third example of the method, optionally including the first and second examples, diverting at least the portion of the fluid through the first bypass conduit includes opening a primary chamber of the dual valve via a set of solenoid valves actuated by a control system of the fluid flow arrangement. In a fourth example of the method, optionally including the first through third examples, adjusting the flowrate in the first bypass conduit includes adjusting the opening of the primary chamber of the dual valve based on a target pressure of the primary conduit, downstream of an outlet of the first bypass conduit.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A fluid flow arrangement, comprising:
   a primary conduit flowing a pressurized fluid;
   a bypass conduit coupled to the primary conduit and configured to divert at least a portion of the pressurized fluid flow from the primary conduit through the bypass conduit;
   a dual solenoid operated control valve arranged in the bypass conduit, the dual solenoid operated control valve configured to control both flow and pressure in the bypass conduit, the dual solenoid operated control valve comprising a first solenoid pilot valve, a second solenoid pilot valve, and a mechanically actuated pressure-reducing pilot valve; and
   a turbine positioned in the bypass conduit and operated based on the fluid flow through the bypass conduit,
   wherein the dual solenoid operated control valve comprises a primary chamber and a secondary chamber, wherein both the first solenoid pilot valve and the second solenoid pilot valve are coupled to the primary chamber, wherein the mechanically actuated pressure-reducing pilot valve is coupled to the secondary chamber, and wherein the primary chamber is controlled based on a flowrate through the bypass conduit and the secondary chamber is controlled based on a pressure in a portion of the bypass conduit downstream of the turbine.

2. The fluid flow arrangement of claim 1, further comprising a control system, wherein the first solenoid pilot valve and the second solenoid pilot valve are controlled by the control system to open and close the primary chamber based on the flowrate detected at a bonnet of the dual solenoid operated control valve.

3. The fluid flow arrangement of claim 1, wherein the first solenoid pilot valve is a closing valve configured to close the primary chamber, and wherein the second solenoid pilot valve is an opening valve configured to open the primary chamber.

4. The fluid flow arrangement of claim 1, wherein the turbine is positioned downstream of the dual solenoid operated control valve.

5. The fluid flow arrangement of claim 1, wherein the first solenoid pilot valve and the second solenoid pilot valve control the flowrate, the flowrate detected based on a pressure balance between an inlet of the dual solenoid operated control valve and a bonnet of the dual solenoid operated control valve.

6. The fluid flow arrangement of claim 5, wherein a position of a diaphragm of the secondary chamber is adjusted based on the mechanically actuated pressure-reducing pilot valve with mechanical set points, and wherein the mechanically actuated pressure-reducing pilot valve is configured to vent excess fluid to decrease pressure when the pressure in the bypass conduit downstream of the turbine rises above a threshold pressure determined by the mechanical set points of the mechanically actuated pressure-reducing pilot valve.

7. The fluid flow arrangement of claim 6, wherein the secondary chamber and the mechanically actuated pressure-reducing pilot valve are configured to control pressure in the bypass conduit when one or more of the primary chamber, the first solenoid pilot valve, and the second solenoid pilot valve are degraded.

8. The fluid flow arrangement of claim 1, further comprising a control system configured with executable instructions to:
- start operating an energy-harvesting assembly upon confirming valid ranges of operating parameters of the energy-harvesting assembly, the energy-harvesting assembly including the bypass conduit, the dual solenoid operated control valve, and the turbine;
- operate the energy-harvesting assembly in a steady state mode while maintaining a downstream pressure in the primary conduit below a threshold pressure; and
- shut down the energy-harvesting assembly when the operating parameters deviate from the valid ranges.

9. A hydroelectric power-generating arrangement, comprising:
- one or more sub-assemblies coupled in parallel to one another and to a primary conduit, each of the one or more sub-assemblies including:
  - a bypass conduit;
  - a dual solenoid operated control valve arranged in the bypass conduit and configured to control flow and pressure in the bypass conduit, the dual solenoid operated control valve comprising a first solenoid pilot valve, a second solenoid pilot valve, and a mechanically actuated pressure-reducing pilot valve; and
  - a turbine arranged in a path of fluid flow through the bypass conduit and coupled to a generator, wherein the generator is configured to provide power to an electrical network,
- wherein the dual solenoid operated control valve comprises a primary chamber and a secondary chamber, wherein the first solenoid pilot valve and the second solenoid pilot valve are both coupled to the primary chamber, wherein the mechanically actuated pressure-reducing pilot valve is coupled to the secondary chamber, and wherein the primary chamber is controlled based on a flowrate through the bypass conduit and the secondary chamber is controlled based on a pressure in a portion of the bypass conduit downstream of the turbine.

10. The hydroelectric power-generating arrangement of claim 9, further comprising a control system configured to adjust an opening of the primary chamber via commands sent from the control system to the first solenoid pilot valve and the second solenoid pilot valve based on the flowrate in the bypass conduit, wherein the first solenoid pilot valve is configured to close the primary chamber responsive to a first command from the control system, the second solenoid pilot valve configured to open the primary chamber responsive to a second command from the control system, and wherein the opening of the secondary chamber is not adjustable based on the commands from the control system.

11. The hydroelectric power-generating arrangement of claim 9, wherein each turbine of the one or more sub-assemblies has a flow capacity and best efficiency point, and wherein each turbine of the one or more sub-assemblies adds additional flow capacity.

12. The hydroelectric power-generating arrangement of claim 9, wherein each turbine of the one or more sub-assemblies is operated based on the turbine's respective flow capacity and a demand of the primary conduit.

13. A method for a fluid flow arrangement, comprising:
- flowing a fluid through a primary conduit;
- diverting at least a portion of the fluid through a first bypass conduit coupled in parallel with the primary conduit;
- adjusting a flowrate and a pressure in the first bypass conduit by a dual solenoid operated control valve arranged in the first bypass conduit, the flowrate adjusted via a first solenoid pilot valve and a second solenoid pilot valve, the first solenoid pilot valve and the second solenoid pilot valve both coupled to a primary chamber of the dual solenoid operated control valve;
- adjusting a pressure through the first bypass conduit via the dual solenoid operated control valve, the pressure adjusted via a mechanically actuated pressure-reducing pilot valve that is coupled to a secondary chamber of the dual solenoid operated control valve; and
- operating a turbine positioned in the first bypass conduit based on the flowrate in the first bypass conduit, wherein the turbine is coupled to a generator and the dual solenoid operated control valve includes the first solenoid pilot valve and the second solenoid pilot valve configured to control fluid flow through the dual solenoid operated control valve,
- wherein the primary chamber is controlled based on a flowrate through a body of the dual solenoid operated control valve, and the secondary chamber is controlled based on a pressure in a portion of the first bypass conduit located downstream of the turbine.

14. The method of claim 13, further comprising diverting the fluid in the primary conduit through additional bypass conduits, each of the additional bypass conduits configured with a respective dual solenoid operated control valve and a respective turbine, wherein the additional bypass conduits are coupled in parallel with the primary conduit, with the first bypass conduit, and with one another.

15. The method of claim 13, wherein diverting at least the portion of the fluid through the first bypass conduit includes opening the primary chamber of the dual solenoid operated control valve via actuation of the first solenoid pilot valve by a control system of the fluid flow arrangement.

16. The method of claim 13, wherein adjusting the flow-rate in the first bypass conduit includes adjusting an opening of the primary chamber of the dual solenoid operated control valve based on a target pressure of the primary conduit, downstream of an outlet of the first bypass conduit, and wherein the opening of the primary chamber is controlled via actuation of the first solenoid pilot valve and the second solenoid pilot valve.

17. The method of claim 13, wherein adjusting the pressure in the first bypass conduit includes adjusting the pressure downstream of the turbine in the first bypass conduit by opening the secondary chamber of the dual solenoid operated control valve via the mechanically actuated pressure-reducing pilot valve when the pressure downstream of the turbine in the first bypass conduit rises above a set point of the mechanically actuated pressure-reducing pilot valve, and wherein the mechanically actuated pressure-reducing pilot valve is coupled to the portion of the bypass conduit that is downstream of the turbine by a pressure sensing line.

18. The fluid flow arrangement of claim 1, wherein the mechanically actuated pressure-reducing pilot valve is mechanically actuated based on a pressure set point.

19. The fluid flow arrangement of claim 1, further comprising:
an inlet valve arranged at a first juncture of the primary conduit and the bypass conduit; and
an outlet valve arranged at a second juncture of the primary conduit and the bypass conduit,
wherein the dual solenoid operated control valve is arranged between the inlet valve and the outlet valve, and
wherein the turbine is positioned downstream of the dual solenoid operated control valve and upstream of the outlet valve.

20. The fluid flow arrangement of claim 1, wherein the secondary chamber is positioned vertically above the primary chamber.

* * * * *